United States Patent
Peters et al.

(10) Patent No.: US 12,245,003 B2
(45) Date of Patent: *Mar. 4, 2025

(54) WIRELESS RADIO SWITCHING

(71) Applicant: Sonos, Inc., Santa Barbara, CA (US)

(72) Inventors: Jeffrey M. Peters, Cambridge, MA (US); Gary Fox, Santa Barbara, CA (US)

(73) Assignee: Sonos, Inc., Goleta, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/503,150

(22) Filed: Nov. 6, 2023

(65) Prior Publication Data

US 2024/0073635 A1    Feb. 29, 2024

Related U.S. Application Data

(63) Continuation of application No. 17/364,944, filed on Jul. 1, 2021, now Pat. No. 11,812,228, which is a
(Continued)

(51) Int. Cl.
*H04R 27/00* (2006.01)
*H04B 1/20* (2006.01)
(Continued)

(52) U.S. Cl.
CPC .............. *H04R 27/00* (2013.01); *H04B 1/20* (2013.01); *H04N 21/43615* (2013.01);
(Continued)

(58) Field of Classification Search
CPC ........ H04R 2420/005; H04R 2227/007; H04R 3/12; H04R 3/00; H04R 27/00
(Continued)

(56) References Cited

U.S. PATENT DOCUMENTS 5,440,644 A    8/1995    Farinelli et al.
5,761,320 A    6/1998    Farinelli et al.
(Continued)

FOREIGN PATENT DOCUMENTS

EP    1389853 A1    2/2004
EP    2383996 A1    11/2011
(Continued)

OTHER PUBLICATIONS

AudioTron Quick Start Guide, Version 1.0, Mar. 2001, 24 pages.
(Continued)

*Primary Examiner* — Disler Paul

(57) ABSTRACT

A playback device comprising a first spectrum radio for communication via a first wireless spectrum and a second spectrum radio for communication via a second wireless spectrum operates in a first mode in which the first spectrum radio is enabled and the second spectrum radio is disabled. While operating in the first mode, the playback device receives a command to join a synchrony group with a display device. Based on the command, the playback device begins to operate in a second mode in which the second spectrum radio is enabled. The playback device receives audio content for playback, wherein the audio content corresponds to video content being displayed at a display device. Using the second spectrum radio, the playback device coordinates with the display device for playing back the audio content in synchrony with the video content.

20 Claims, 12 Drawing Sheets

Related U.S. Application Data continuation of application No. 16/866,258, filed on May 4, 2020, now Pat. No. 11,057,725, which is a continuation of application No. 16/404,173, filed on May 6, 2019, now Pat. No. 10,645,504, which is a continuation of application No. 15/623,680, filed on Jun. 15, 2017, now Pat. No. 10,284,981, which is a continuation of application No. 14/691,323, filed on Apr. 20, 2015, now Pat. No. 9,706,319.

(51) Int. Cl.
*H04N 21/436* (2011.01)
*H04N 21/4363* (2011.01)
*H04N 21/439* (2011.01)
*H04N 21/442* (2011.01)
*G06F 16/60* (2019.01)
*H04L 12/28* (2006.01)
*H04R 3/00* (2006.01)
*H04R 29/00* (2006.01)

(52) U.S. Cl.
CPC ..... *H04N 21/43637* (2013.01); *H04N 21/439* (2013.01); *H04N 21/442* (2013.01); *H04N 21/44209* (2013.01); *H04N 21/44227* (2013.01); *H04N 21/44231* (2013.01); *G06F 16/60* (2019.01); *H04L 12/2838* (2013.01); *H04R 3/00* (2013.01); *H04R 29/007* (2013.01); *H04R 2227/005* (2013.01); *H04R 2420/07* (2013.01)

(58) Field of Classification Search
USPC ..................................................... 381/77, 79
See application file for complete search history.

(56) References Cited

U.S. PATENT DOCUMENTS

| | | |
|---|---|---|
| 5,923,902 A | 7/1999 | Inagaki |
| 6,032,202 A | 2/2000 | Lea et al. |
| 6,256,554 B1 | 7/2001 | DiLorenzo |
| 6,404,811 B1 | 6/2002 | Cvetko et al. |
| 6,469,633 B1 | 10/2002 | Wachter |
| 6,522,886 B1 | 2/2003 | Youngs et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,391,791 B2 | 6/2008 | Balassanian et al. |
| 7,483,538 B2 | 1/2009 | McCarty et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,853,341 B2 | 12/2010 | McCarty et al. |
| 7,925,203 B2 | 4/2011 | Lane et al. |
| 7,987,294 B2 | 7/2011 | Bryce et al. |
| 8,014,423 B2 | 9/2011 | Thaler et al. |
| 8,045,952 B2 | 10/2011 | Qureshey et al. |
| 8,103,009 B2 | 1/2012 | McCarty et al. |
| 8,190,797 B2* | 5/2012 | Barbe ................ H04L 12/2814 710/62 |
| 8,234,395 B2 | 7/2012 | Millington |
| 8,483,853 B1 | 7/2013 | Lambourne |
| 8,699,723 B2 | 4/2014 | Fried et al. |
| 8,942,252 B2 | 1/2015 | Balassanian et al. |
| 9,031,255 B2 | 5/2015 | Beckhardt et al. |
| 9,706,319 B2 | 7/2017 | Peters et al. |
| 9,882,995 B2 | 1/2018 | Van et al. |
| 9,883,296 B2* | 1/2018 | Flood ........................ H03H 7/38 |
| 9,949,038 B2* | 4/2018 | Guindi ................ H04R 25/305 |
| 9,980,059 B2 | 5/2018 | Gehring et al. |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0124097 A1 | 9/2002 | Isely et al. |
| 2003/0157951 A1 | 8/2003 | Hasty, Jr. |
| 2004/0024478 A1 | 2/2004 | Hans et al. |
| 2004/0198420 A1 | 10/2004 | He et al. |
| 2006/0063560 A1 | 3/2006 | Herle |
| 2007/0142944 A1 | 6/2007 | Goldberg et al. |
| 2008/0273505 A1 | 11/2008 | Hollingsworth et al. |
| 2011/0249818 A1 | 10/2011 | Sawada et al. |
| 2012/0029671 A1 | 2/2012 | Millington et al. |
| 2012/0182954 A1 | 7/2012 | Cordeiro et al. |
| 2013/0173794 A1 | 7/2013 | Agerbak et al. |
| 2013/0336499 A1 | 12/2013 | Beckhardt et al. |
| 2015/0031287 A1 | 1/2015 | Pang et al. |
| 2015/0095680 A1 | 4/2015 | Gossain et al. |
| 2015/0304471 A1 | 10/2015 | Frandsen |
| 2016/0162015 A1 | 6/2016 | Moon |
| 2018/0124527 A1* | 5/2018 | El-Hoiydi .............. H04H 20/53 |

FOREIGN PATENT DOCUMENTS

| | | |
|---|---|---|
| EP | 2555514 A1 | 2/2013 |
| EP | 2773128 A2 | 9/2014 |
| WO | 200153994 | 7/2001 |
| WO | 2003093950 A2 | 11/2003 |
| WO | 2011139666 A3 | 2/2012 |
| WO | 2012101481 A1 | 8/2012 |
| WO | 2013089891 A1 | 6/2013 |
| WO | 2014154062 A1 | 10/2014 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European Office Action mailed on Oct. 9, 2018, issued in connection with European Application No. 16724985.3, 7 pages.
European Patent Office, Summons to Attend Oral Proceedings mailed on Nov. 21, 2019, issued in connection with European Application No. 16724985.3, 8 pages.
Final Office Action mailed on May 23, 2018, issued in connection with U.S. Appl. No. 15/623,680, filed Jun. 15, 2017, 28 pages.
International Searching Authority, International Search Report and Written Opinion mailed on Jun. 28, 2016, issued in connection with International Application No. PCT/US2016/028054, filed on Apr. 18, 2016, 12 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action mailed on Oct. 7, 2016, issued in connection with U.S. Appl. No. 14/691,323, filed Apr. 20, 2015, 20 pages.
Non-Final Office Action mailed on Apr. 19, 2023, issued in connection with U.S. Appl. No. 17/364,944, filed Jul. 1, 2021, 17 pages.

(56) References Cited

OTHER PUBLICATIONS

Non-Final Office Action mailed on Oct. 21, 2020, issued in connection with U.S. Appl. No. 16/866,258, filed May 4, 2020, 9 pages.
Non-Final Office Action mailed on Sep. 22, 2017, issued in connection with U.S. Appl. No. 15/623,680, filed Jun. 15, 2017, 21 pages.
Non-Final Office Action mailed on Aug. 28, 2018, issued in connection with U.S. Appl. No. 15/623,680, filed Jun. 15, 2017, 12 pages.
Non-Final Office Action mailed on Sep. 30, 2019, issued in connection with U.S. Appl. No. 16/404,173, filed May 6, 2019, 10 pages.
Notice of Allowance mailed on May 2, 2017, issued in connection with U.S. Appl. No. 14/691,323, filed Apr. 20, 2015, 14 pages.
Notice of Allowance mailed on Jan. 10, 2020, issued in connection with U.S. Appl. No. 16/404,173, filed May 6, 2019, 5 pages.
Notice of Allowance mailed on Feb. 12, 2021, issued in connection with U.S. Appl. No. 16/866,258, filed May 4, 2020, 5 pages.
Notice of Allowance mailed on Sep. 13, 2023, issued in connection with U.S. Appl. No. 17/364,944, filed Jul. 1, 2021, 8 pages.
Notice of Allowance mailed on Dec. 28, 2018, issued in connection with U.S. Appl. No. 15/623,680, filed Jun. 15, 2017, 5 pages.
Palm, Inc., "Handbook for the Palm VII Handheld," May 2000, 311 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

\* cited by examiner

WIRELESS RADIO SWITCHING

CROSS REFERENCE TO RELATED APPLICATION

This disclosure claims the benefit of priority under 35 U.S.C. § 120 as a continuation of U.S. application Ser. No. 17/364,944, entitled "Wireless Radio Switching" filed on Jul. 1, 2021, which is a continuation of U.S. application Ser. No. 16/866,258, issued as U.S. Pat. No. 11,057,725, entitled "Wireless Radio Switching" filed on May 4, 2020, which is a continuation of U.S. application Ser. No. 16/404,173, issued as U.S. Pat. No. 10,645,504, entitled "Wireless Radio Switching" filed on May 6, 2019, which is a continuation of U.S. application Ser. No. 15/623,680, issued as U.S. Pat. No. 10,284,981, entitled "Wireless Radio Switching" filed on Jun. 15, 2017, which is a continuation of U.S. application Ser. No. 14/691,323, issued as U.S. Pat. No. 9,706,319, entitled "Wireless Radio Switching" filed on Apr. 20, 2015, the contents of each of which are hereby incorporated by reference in their entirety.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc., filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
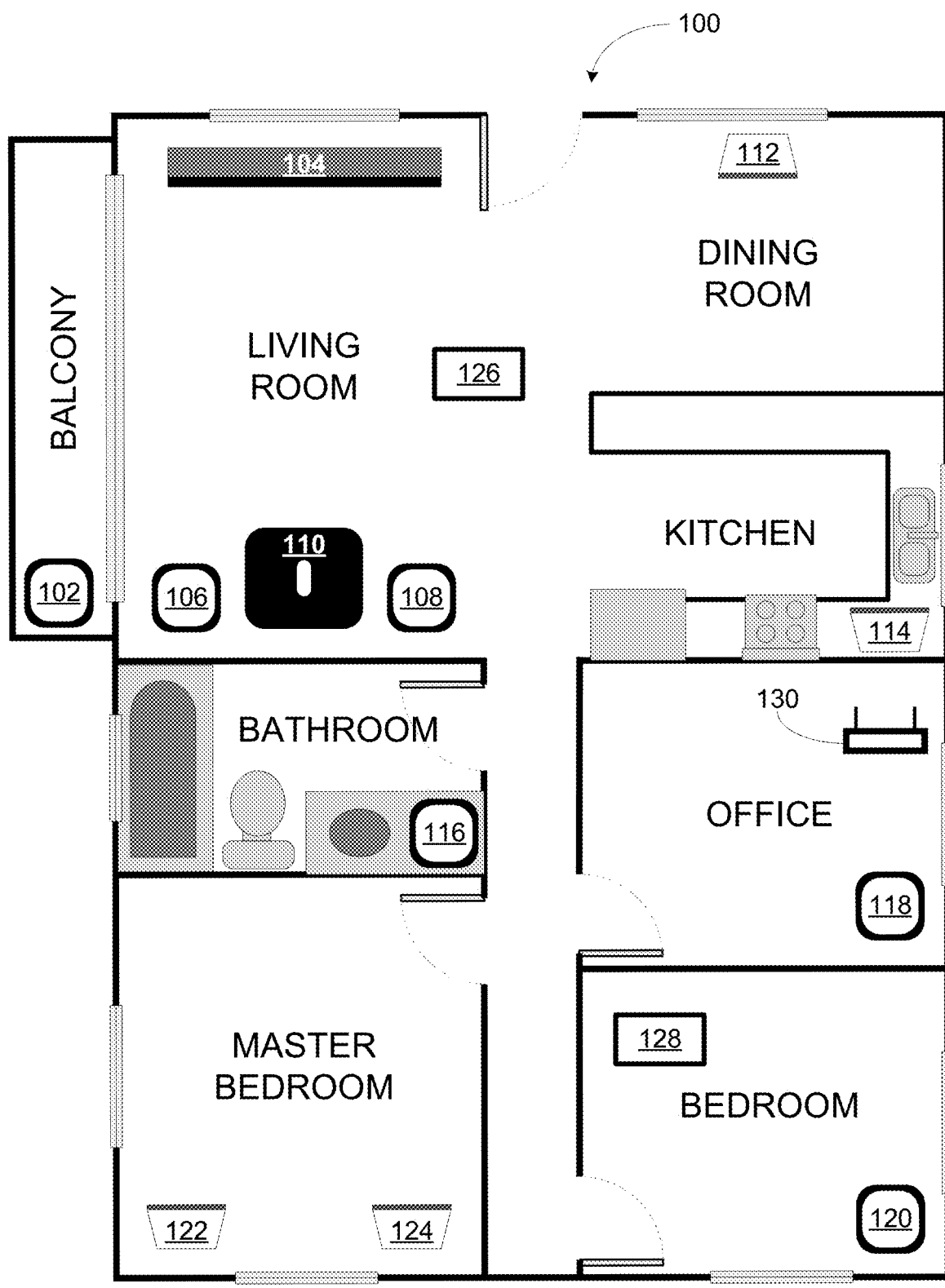
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

In the present application, systems and methods are provided to offer a unique wired, wireless, or both wired and wireless audio solution that allows audio content to, among other things, be played in a single listening zone or across multiple listening zones simultaneously and in synchrony. The audio content may be played out loud or using headphones, for instance. In an example, such a system may include audio devices, often referred to as zone players, players or playback devices, and controllers, which may also be a player. One or more controllers may be used to control the system, and may include capabilities for browsing and selecting audio content for playback, viewing and editing audio content in one or more playback queues, or grouping and ungrouping zone players into one or more listening zones, etc. The system may operate, in some embodiments, as a distributed system such that each controller has full control over the entire system, and each player has the ability to play audio content from either a same audio source or a different audio source as another player.

Example systems, methods, apparatus, and articles of manufacture disclosed herein manage wireless radios in a playback device. Example system, methods, apparatus, and articles of manufacture disclosed herein may be advantageously used to provide wireless playback of audio in a home theater environment while conserving power used by the playback devices. Embodiments disclosed herein may be further useful in systems in which the playback devices are not coupled to a continuous power source (e.g., operate via batteries).

As described in greater detail below, the systems, methods, apparatus, and articles of manufacture disclosed herein can provide a user of an audio playback device with a control method using different user input devices. In an example of operation, a home theater audio system is connected to a television. The example home theater audio system includes a sound bar positioned near the television and directed at a viewer, two satellite speakers positioned in front of and on the left and right sides of the viewer, two satellite speakers positioned behind and on the left and right sides of the viewer, and a subwoofer (which may be a type of satellite speaker). In this example, the sound bar establishes and controls a network that wirelessly connects to each of the satellite speakers and the subwoofer. In home theater mode, the example home theater audio system may play back audio corresponding to video played on the television.

Continuing with the example, the sound bar receives audio from the television (or other audio or video source devices such as a CD, DVD, or Blu-ray™ player, or separately via an Internet audio or video streaming service), and transmits respective audio to the satellite speakers and the subwoofer. The example sound bar can communicate with other zone players in the system via wireless channels in a first wireless spectrum, such as a 2.4 GHz channel, and can communicate (e.g., concurrently communicate) with other zone players such as the satellite speakers and the subwoofer via wireless channels in a second wireless spectrum, such as a 5 GHz spectrum channel. However, in some instances, it may not be advantageous to continuously maintain connectivity via the first and second wireless spectrums. For example, when the home theater system is not being accessed by a user (e.g., the user is not watching the television), examples disclosed herein disable communicating with the satellite speakers via wireless channels in the second wireless spectrum. In some such examples, the sound bar conserves power by disabling wireless spectrum radios that communicate via the second wireless spectrum.

In some examples, the sound bar communicates (e.g., receives and/or transmits) control information (e.g., configuration information, keep-alive probes, channel probes, power savings information, etc.) via wireless channels in the first wireless spectrum and communicates audio information (e.g., audio content, playback commands, etc.) via wireless channels in the second wireless spectrum. Embodiments disclosed herein disable a wireless radio of the sound bar (e.g., a second wireless spectrum radio) when the sound bar is grouped with at least one satellite speaker (e.g., the sound bar is in a bonded zone) and the sound bar is not playing back audio information. For example, while the sound bar is idle (e.g., not receiving audio information such as audio content from the television and/or a satellite speaker in the bonded zone), the sound bar disables the second wireless spectrum radio. To limit loss in communication between the sound bar and the speakers, in some such examples, the sound bar communicates a message (e.g., a probe) to the satellite speakers and the subwoofer instructing the respective speaker to switch to communicating via wireless channels in the first wireless spectrum.

Some embodiments disclosed herein disable the second wireless radio when one or more playback devices in a bonded zone are offline (e.g., powered-off, unplugged, etc.). For example, in response to control information (e.g., configuration information indicating a satellite speaker is offline) and/or the lack of control information (e.g., no keep-alive probe sent from a satellite speaker, no acknowledgment response to a keep-alive probe, etc.), the sound bar may disable the second wireless radio. Additional or alternative embodiments may disable the second wireless radio when the sound bar is the only playback device online in a bonded zone. For example, in the home theater system described above, the sound bar may disable the second wireless radio in response to the satellite speakers and the subwoofer being offline.

While some examples described herein may refer to functions performed by given actors such as "users" and/or other entities, it should be understood that this is for purposes of explanation only. The claims should not be interpreted to require action by any such example actor unless explicitly required by the language of the claims themselves. It will be understood by one of ordinary skill in the art that this disclosure includes numerous other embodiments.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as a commercial setting like a restaurant, mall or airport, a vehicle like a sports utility vehicle (SUV), bus or car, a ship or boat, an airplane, and so on.

a. Example Playback Devices

Figure 2:
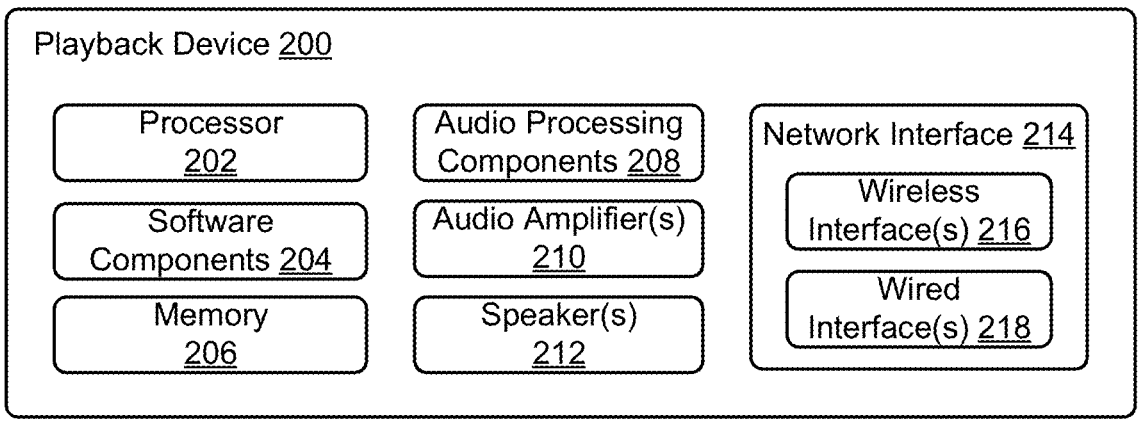
FIG. 2 shows a functional block diagram of an example playback device.

FIG. 2 shows a functional block diagram of an example playback device 200 that may be configured to be one or more of the playback devices 102-124 of the media playback system 100 of FIG. 1. The example playback device 200 of FIG. 2 includes a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through the speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive control information (e.g., configuration information, keep-alive probes, channel probes, power savings information, etc.) and/or audio information (e.g., audio content and/or playback controls such as "play," "pause," "stop," etc.) over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 includes wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wireless interface(s) 216 may include one or more radios, which may be separately operable, selectively powered on/off, disabled/enabled, etc. based on one or more configuration parameters and/or operating criterion. The wired interface(s) 218 may provide network interface functions for the playback device 200 to communicate over a wired connection with other devices in accordance with a communication protocol (e.g., IEEE 802.3). While the network interface 214 shown in FIG. 2 includes both the wireless interface(s) 216 and the wired interface(s) 218, the network interface 214 may in some embodiments include only the wireless interface(s) 216 or only the wired interface(s) 218.

In one example, the playback device 200 and one other playback device may be paired to play two separate audio components of audio content. For instance, the playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e., a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added and/or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, the playback devices 104, 106, 108, 110 may be configured to play audio content in synchrony as individual playback devices, as one or more bonded playback devices, as one or more consolidated playback devices, or any combination thereof. Similarly, in the case of the master bedroom, the playback devices 122, 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, the playback devices 102, 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126, 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone may be combined into a zone group for a dinner party such that the playback devices 112, 114 may render audio content in synchrony. On the other hand, the living room zone may be split into a television zone including playback device 104, and a listening zone including playback devices 106, 108, 110, if the user wishes to listen to music in the living room space while another user wishes to watch television.

In some embodiments, the example living room zone playback devices 104, 106, 108, 110 are coupled to an audio information source such as a television. In some examples, the television is used as a source of audio for the living room zone playback devices 104, 106, 108, 110, while in other examples audio information from the television may be shared with any of the zone players 102-124 in the media playback system 100.

c. Example Control Devices

Figure 3:
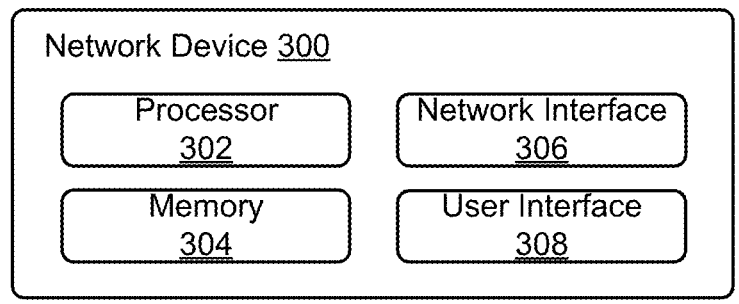
FIG. 3 shows a functional block diagram of an example control device.

FIG. 3 shows a functional block diagram of an example control device 300 that may be configured to be one or both of the control devices 126, 128 of the media playback system 100 of FIG. 1. As shown, the control device 300 of Figure includes a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between the control device 300 and other devices via the network interface 306. For instance, playback zone and zone group configurations (e.g., configuration information) in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control (e.g., audio information) may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
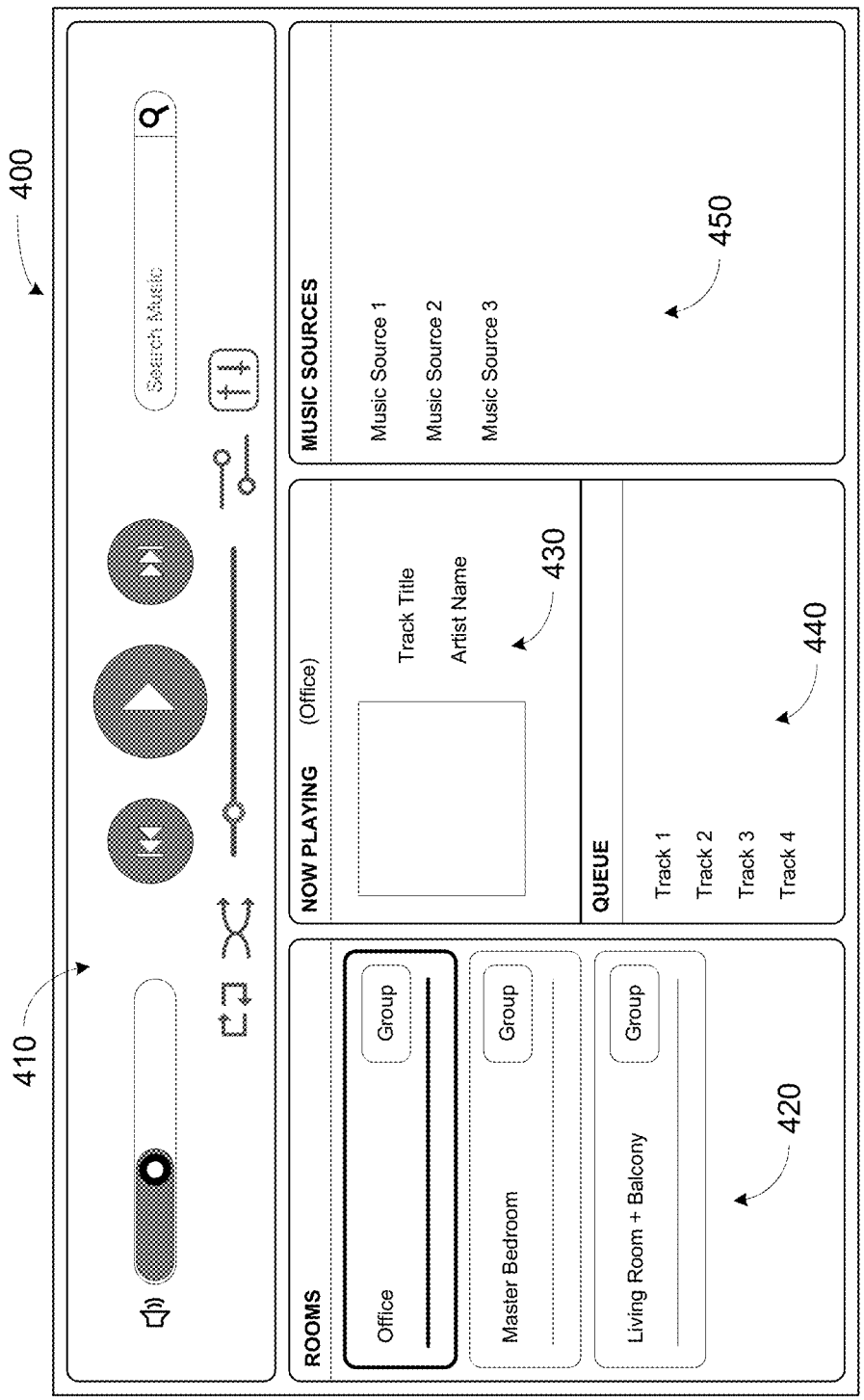
FIG. 4 shows an example controller interface.

The user interface 308 of the control device 300 may be configured to facilitate user access and control of the media playback system 100, by providing a controller interface such as the controller interface 400 shown in FIG. 4. The example controller interface 400 of FIG. 4 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126, 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown in the illustrated example of FIG. 4, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network device, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

III. Example Wireless Radio Switching

The following definitions will be used throughout this disclosure:

The terms "spectrum" or "wireless spectrum" refer to a range of wireless communications frequencies, where different "spectra" (multiple spectrum) refer to different ranges of wireless frequencies. Different spectra may or may not overlap. Different spectra may or may not be contiguous (e.g., may or may not have spectra between them). In some examples disclosed herein, the term spectrum refers to a regulatory spectrum as defined by a regulatory agency such as the Federal Communications Commission (FCC) in the United States. For example, the FCC has allocated the "2.4 GHz spectrum" (or spectral band) to include the frequency range of 2400 MHz to 2500 MHz for Industrial, Scientific, and medical applications. Additionally, the FCC has allocated the "5 GHz spectrum" (or spectral band) to include the frequency range of about 5.17 GHz to about 5.835 GHz, with some excepted bands within that range.

The terms "channel," "audio channel," "control channel" and/or, more generally, "wireless channel" all refer to a distinct frequency or distinct sub-range(s) of frequencies within one or more spectra that may be used to transmit particular information. A channel may be a band of frequencies, a non-contiguous set of frequencies and bands, a frequency hopping configuration, time division multiplexing, code division multiplexing and/or any other type of communication frequency arrangement.

The terms "primary," "primary zone player" and/or "group master" refer to a zone player configured to manage, control, and/or direct at least some aspects of a playback network having zero or more "satellite" zone players. A "satellite" or "satellite zone player" refers to a zone player configured to provide audio in combination with a primary zone player. As described in more detail below, a primary zone player includes multi-concurrent wireless radios and a satellite zone player includes switching wireless radios. Both primary zone players and satellite zone players may be configurable to operate in other playback arrangements, such as in a zone group.

Figure 5:
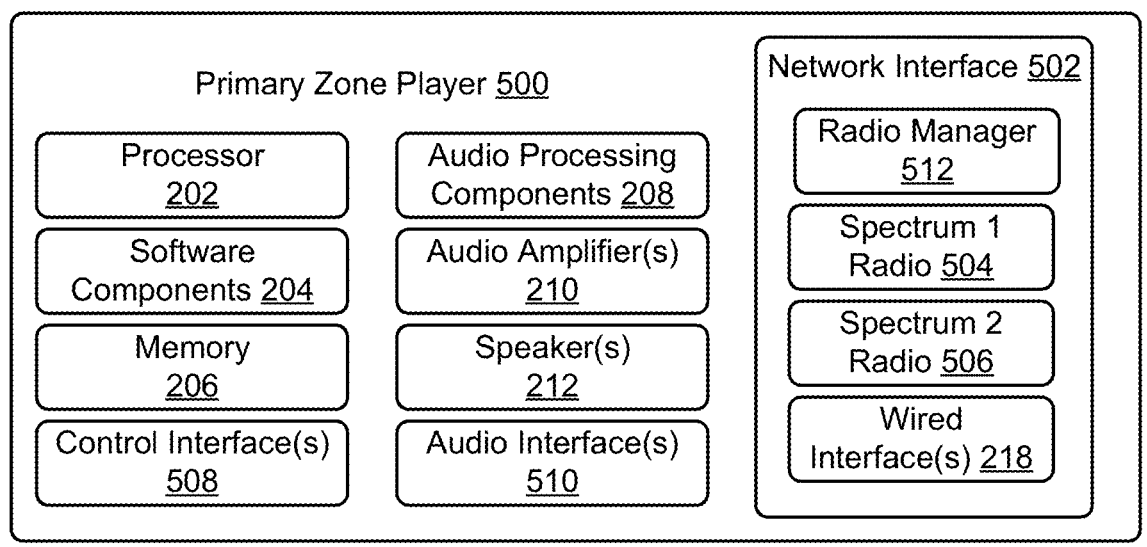
FIG. 5 shows an internal functional block diagram of an example primary zone player to manage wireless radios.

FIG. 5 shows an internal functional block diagram of an example primary zone player 500 to manage wireless radios. The example primary zone player 500 of FIG. 5 may be used to implement any of the example zone players 102-124 of FIG. 1. In some embodiments, the example primary zone player 500 may be used to implement one of the living room zone playback devices 104, 106, 108, 110. In the illustrated example, the playback device 104 is a sound bar and a group master for the living room zone playback devices 104, 106, 108, 110. As used herein, a "sound bar" refers to a single playback device including an array of speakers arranged to replicate audio for video and to replicate audio in general. In some instances, a sound bar may simulate or partially simulate a surround sound experience. However, it should be understood that the disclosure pertaining to the example "sound bar" could be applied to any other suitable zone player.

Like the example zone player 200 of FIG. 2, the example primary zone player 500 of FIG. 5 includes a processor 202, software components 204, memory 206, audio processing components 208, audio amplifier(s) 210 and speaker(s) 212. These components are discussed in more detail above. More or less components may be included depending on the desired configuration.

The example primary zone player 500 of FIG. 5 includes a network interface 502 having wired interface(s) 218, a first spectrum radio 504 (Spectrum 1 radio) and a second spectrum radio 506 (Spectrum 2 radio). The wired interface(s) 218 are discussed above. The example network interface 502 includes the first spectrum radio 504 to communicate (e.g., transmit and/or receive) via a first wireless spectrum (e.g., the 2.4 GHz spectrum). The example network interface 502 includes the second spectrum radio 506 to communicate via a second wireless spectrum different from the first wireless spectrum (e.g., the 5 GHz spectrum). The example spectrum radios 504, 506 are multi-concurrent wireless radios that may be enabled at the same time. Accordingly, the example primary zone player 500 may simultaneously communicate via any or all of the wired interface(s) 218 and/or the spectrum radios 504, 506.

Each of the example wired interface(s) 218 and the example spectrum radios 504, 506 of FIG. 5 may have a unique identifier such as a unique Media Access Control (MAC) address. Thus, each of the example wired interface(s) 218 and the example spectrum radios 504, 506 may be addressed separately, and the example primary zone player 500 may communicate using any or all of the wired interface(s) 218 and/or the spectrum radios 504, 506 simultaneously if so desired.

The example primary zone player 500 of FIG. 5 also includes control interface(s) 508 and audio interface(s) 510. The control interface(s) 508 may transmit and/or receive control information (e.g., configuration information, channel probes, keep-alive probes, power savings information, etc.) via the first and/or second spectrum radios 504, 506. For example, the control interface(s) 508 may communicate configuration information (e.g., current and/or saved zone group configuration information) to one or more satellite zone players and/or communicate configuration information (e.g., current and/or saved zone group configuration information) to one or more other zone players via the first spectrum radio 504. In some examples, the control interface(s) 508 receive configuration information via the first spectrum radio 504 from other zone players. In some examples, the control interface(s) 508 request (e.g., periodically requests, aperiodically requests and/or as a one-time event) configuration information via the first spectrum radio 504 from other zone players. The example control interface(s) 508 additionally or alternatively communicates control information (e.g., channel probes, keep-alive probes, etc.) to satellite zone players via the second spectrum radio 506.

The example audio interface(s) 510 of FIG. 5 may transmit audio information and/or receive audio information (e.g., audio content, playback commands, etc.) via the wired interface(s) 218 and/or the spectrum radios 504, 506. For example, the audio interface(s) 510 may receive digital audio information from an Internet source, from a local networked source (e.g., a computer via a LAN) and/or from another home theater component such as a television, a cable box, an optical media player (e.g., DVD, Blu-ray disc, etc.), a digital media player, a video game console and/or any other type of audio source. The example audio interface(s) 510 further transmit received audio information to one or more zone players, including standard zone players (e.g., via line-out connection (e.g., RCA or optical output, TOSlink, etc.), or via a mesh network via the first spectrum radio 504, such as a 2.4 GHz wireless spectrum) and/or satellite zone players (e.g., via a peer-to-peer network (sometimes referred to as a star network) via the first spectrum radio 504 and/or the second spectrum radio 506). In some examples, the audio interface(s) 510 transmit the audio information, including a play command received from a controller (e.g., the example control devices 126, 128 of FIG. 1 and/or the example control device 300 of FIG. 3) and/or other zone player, provided by the control interface(s) 508. Examples of operation of the example first spectrum radio 504, the second spectrum radio 506, the control interface(s) 508 and the audio interface(s) 510 are described in more detail below.

As described above, the control interface(s) 508 may communicate control information via the first and/or second spectrum radios 504, 506, and the audio interface(s) 510 may communicate audio information via the wired interface(s) 218 and/or the spectrum radios 504, 506. Thus, in some examples, the control interface(s) 508 and the audio interface(s) 510 communicate control information and audio information, respectively, via the first spectrum radio 504. In some examples, the control interface(s) 508 and the audio interface(s) 510 communicate control information and audio information, respectively, via the second spectrum radio 506. In some examples, the control interface(s) 508 communicate control information via the first spectrum radio 504 and the audio interface(s) 510 communicate audio information via the second spectrum radio 506. In some examples, the control interface(s) 508 communicate control information via the second spectrum radio 506 and the audio interface(s) 510 communicate audio information via the first spectrum radio 504.

To manage power consumption of the primary playback device 500, the example network interface 502 further includes a radio manager 512. The example radio manager 512 controls the power status of the spectrum radios 504, 506 based on the configuration of the primary playback device 500 and content playback. The power status of a wireless radio refers to whether the wireless radio is enabled (e.g., active, activated, "ON," etc.) to transmit and/or receive information or the wireless radio is disabled (e.g., deactivated, "OFF," etc.) from transmitting and/or receiving information in the respective spectrum. In the illustrated example, the radio manager 512 disables a wireless radio when the wireless radio is not being used to transmit and/or receive information. The example radio manager 512 of FIG. 5 conserves power by facilitating using the first spectrum radio 504 (e.g., the 2.4 GHz spectrum) for network connectivity and disabling the second spectrum radio 506 (e.g., the 5 GHz spectrum).

In some examples, a wireless radio is an unused radio when the primary zone player 500 is acting as a "stand-alone" zone (e.g., included in a zone group of one playback device, etc.). For example, configuration information received at the control interface(s) 508 may indicate the primary zone player 500 is not part of a bonded zone. In some examples, the radio manager 512 periodically activates the second spectrum radio 506 (e.g., every three milliseconds, every three seconds, etc.) and the control interface(s) 508 scan the second wireless spectrum (e.g., the 5 GHz spectrum) for unused channels.

In some examples, a wireless radio is an unused radio when the primary zone player 500 is part of a bonded group (sometimes referred to as a "bonded zone player") but not playing audio content. For example, audio information, including a playback queue, one or more media items, one or more items from an audio source, etc., received at the audio interface(s) 510 may be indicative of playing audio content. When the audio information indicates that the primary zone player 500 is not playing audio, the example radio manager 512 of FIG. 5 disables the second spectrum radio 506.

In some examples, when the primary zone player 500 is a bonded zone player, the radio manager 512 determines whether a satellite zone player in the bonded zone is bridging traffic. For example, control information (e.g., bridging information) received at the control interface(s) 508 may indicate that a satellite zone player is transmitting and/or receiving information via a network router such as the example network router 130 of FIG. 1. In addition or alternatively, audio information received at the audio interface(s) 510 may indicate that a satellite zone player is transmitting and/or receiving information (e.g., streaming audio from a cloud-based network). When the radio manager 512 determines that no satellite zone players in the bonded zone are bridging traffic, the radio manager 512 of FIG. 5 disables the second spectrum radio 506. For example, the radio manager 512 may determine that no bridging information is received and/or that bridging information received indicates that no bridge trafficking is occurring in the bonded zone.

In some examples, after the radio manager 512 disables a spectrum radio, the radio manager 512 periodically re-enables the spectrum radio (e.g., every three milliseconds, every three seconds, etc.). For example, when the radio manager 512 disables the second spectrum radio 506 after determining that the primary zone player 500 is not part of a bonded zone, the radio manager 512 may temporarily enable the second spectrum radio 506 (e.g., for one second) before disabling the second spectrum radio 506 again. In some such examples, the control interface(s) 508 may request configuration information from other zone players to determine whether a configuration change was requested (e.g., via the controllers 126, 128, 300, via another zone player, etc.). If the control interface(s) 08 determines that a configuration change was requested (e.g., an "add satellite" command was received, a request to join and/or form a bonded zone was received, etc.) and that the primary zone player 500 is to be added to a bonded zone (e.g., with a satellite zone player), the radio manager 512 of FIG. 5 stops disabling the second spectrum radio 506. Methods, apparatus and system for adding the zone player are described by, for example, by Beckhardt et al. in U.S. patent application Ser. No. 13/524,808, filed on Jun. 15, 2012, which is hereby incorporated by reference in its entirety.

In some examples, when the radio manager 512 disables a wireless radio of a bonded zone player (e.g., no satellite zone players in the bonded zone are bridging traffic and the bonded zone player is not playing audio content), the radio manager 512 of FIG. 5 waits for an indication that a satellite zone player in the bonded zone begins bridging traffic and/or the bonded zone player begins playing audio content. For example, when a satellite zone player begins bridging traffic (e.g., the wired interface(s) 218 indicate active data transferring, shows "link up," etc.), the radio manager 512 enables the second spectrum radio 506 and transfers the bridging traffic to the second spectrum radio 506.

To determine when the bonded zone player begins playing audio content, the control interface(s) 508 may receive audio information including a command to play. For example, the control interface(s) 508 may receive audio information (e.g., a probe or other playback information) from a controller to begin playing audio content. In other examples, the control interface(s) 508 may receive audio information (e.g., a probe or other playback information including a command to begin playing audio content) from another zone player. For example, a user may press the "play" button on a satellite zone player, which then forwards a play command to the primary zone player 500.

In other examples, the control interface(s) 508 may receive a command to begin playing audio content from another zone player that is not a part of the bonded zone, but is a part of the same media playback system as the primary zone player 500. For example, referring to the media playback system 100 of FIG. 1, the primary zone player in the "Living Room" zone (e.g., the sound bar 104) may receive control information from the zone player 114 in the "Kitchen" zone, which may be the group master (or control point) for the media playback system 100.

Additionally or alternatively, the bonded zone player begins playing audio content when the audio interface(s) 510 receive and/or detect a signal (e.g., via a line-out connection such as RCA or optical output, TOSlink, etc.).

Although the primary zone player 500 shown in the example of FIG. 5 includes two wireless spectrum radios (e.g., dual-concurrent wireless radios), the primary zone player 500 may include any other number of wireless spectrum radios. For example, the primary zone player 500 may include wireless radios that operate at frequencies other than the 2.4 GHz spectrum and the 5 GHz spectrum. In some such examples, the radio manager 512 may enable and/or disable the additional wireless radios using a similar approach as described herein.

Figure 6:
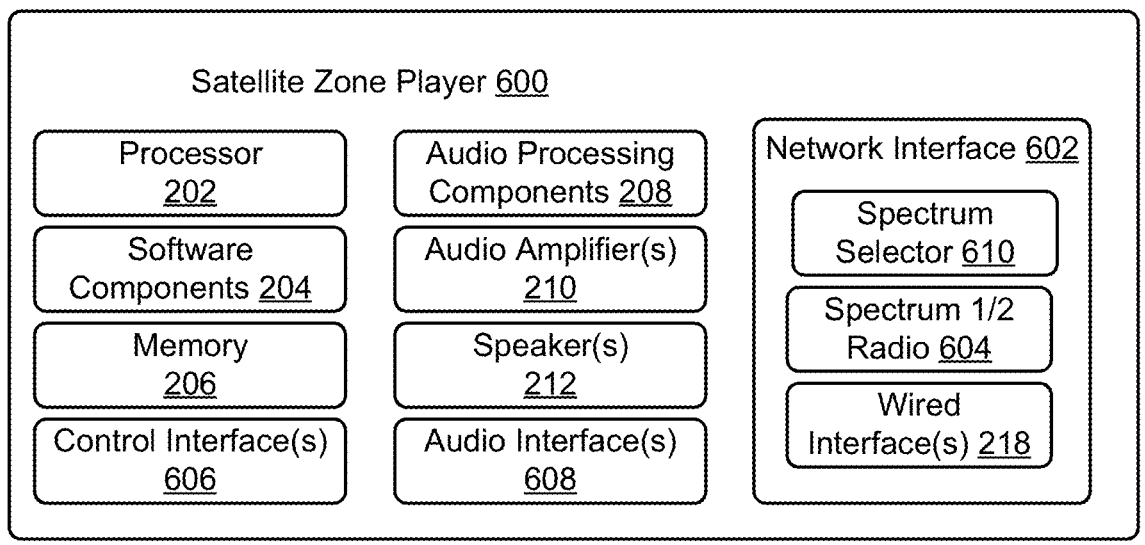
FIG. 6 shows an internal functional block diagram of an example satellite zone player to manage wireless radios in combination with the example primary zone player of FIG. 5.

FIG. 6 shows an internal functional block diagram of an example satellite zone player 600 to provide audio in combination with the example primary zone player 500 of FIG. 5. The example satellite zone player 600 of FIG. 6 may be used to implement any of the example zone players 102-124 of FIG. 1. In some embodiments, the example primary zone player 500 may be used to implement any of the living room zone playback devices 104, 106, 108, 110 and/or may be satellite speakers (e.g., left/right surround speakers, subwoofers, etc.) to complement a sound bar-type surround sound configuration.

Like the example zone player 200 of FIG. 2 and the example primary zone player 500 of FIG. 5, the example satellite zone player 600 of FIG. 6 includes a processor 202, software components 204, memory 206, audio processing components 208, audio amplifier(s) 210 and speaker(s) 212. These components are discussed in detail above. More or less components may be included depending on the desired configuration. The example satellite zone player 600 of FIG. 6 includes a network interface 602 having a switching spectrum radio 604 (Spectrum 1/2 radio) to communicate via a first wireless spectrum (e.g., the 2.4 GHz spectrum) and a second wireless spectrum different from the first wireless spectrum (e.g., the 5 GHz spectrum), and wired interface(s) 218. The wired interface(s) 218 are discussed above.

In the examples of FIGS. 5 and 6, the switching spectrum radio 604 communicates in the same two spectra as the first and second wireless radios 504, 506. The example switching spectrum radio 604 may communicate in either the first spectrum (e.g., on a wireless channel in the first spectrum) or the second spectrum (e.g., on a wireless channel in the second spectrum) at a given time. In some other examples, the dual spectrum wireless radios 504, 506 may communicate in both spectra simultaneously or substantially simultaneously. In some examples, the switching spectrum radio 504 is replaced with separate first and second wireless radios, which may be similar or identical to the first and second wireless spectrum radios 504, 506 of FIG. 5. In some embodiments, each wireless radio is assigned a unique address (e.g., a MAC address).

The example satellite zone player 600 of FIG. 6 further includes control interface(s) 606 and audio interface(s) 608. The control interface(s) 606 and the audio interface(s) 608 transmit and/or receive information (e.g., control information and/or audio information) via the switching spectrum radio 604 and/or the wired interface(s) 218. The example control interface(s) 606 receive control information via a channel (e.g., from the primary zone player 500 of FIG. 5) in a first spectrum (e.g., Spectrum 1). The control information via the first spectrum indicates an audio channel in a second spectrum (e.g., Spectrum 2) via which audio information in addition to control information is to be transmitted to the satellite zone player 600 from the primary zone player 500. The example control interface(s) 606 also transmit control information, such as probe acknowledgments, configuration information, device information, and/or other information used for control and/or configuration of the satellite zone player 600 to a primary zone player 500 and/or to standard zone players (e.g., the example playback device 200 of FIG. 2).

The example audio interface(s) 608 of FIG. 6 receive audio information to be played (e.g., via the speaker(s) 212). The audio information may be received via an audio channel via which the switching spectrum radio 604 is communicating. In some examples, the audio interface(s) 608 determine that the received audio information has a high quality of service characteristic and/or a low latency, indicating that the audio is to be played as soon as possible and/or at a designated time. The audio interface(s) 608 may then process the received audio information in accordance with the teachings of Beckhardt et al., U.S. patent application Ser. No. 13/524,808.

The example network interface 602 of FIG. 6 further includes a spectrum selector 610. The example spectrum selector 610 selects a wireless communications channel in the first spectrum or the second spectrum and causes the switching spectrum radio 604 to begin communicating on the selected channel.

In some examples, the control interface(s) 606 may receive a notification from a primary zone player that communication is to be changed to a different channel in the second spectrum (e.g., the 5 GHz spectrum). This may occur if, for example, the channel being used has become unsuitable for low-latency audio and another, more suitable channel is available. The example control interface(s) 606 provide the new channel to the spectrum selector 610, which causes the switching spectrum radio 604 to change channels within the same spectrum. In some examples, the control interface(s) 606 may receive a notification from a primary zone player that communication is to be changed to a channel in the first spectrum (e.g., the 2.4 GHz spectrum). This may occur if, for example, the channel being used has become unsuitable for low-latency audio and no other more suitable channel is available in the second spectrum (e.g., the 5 GHz spectrum). The example control interface(s) 606 provide the channel to the spectrum selector 610, which causes the switching spectrum radio 604 to change channels and spectrum.

Figure 7:
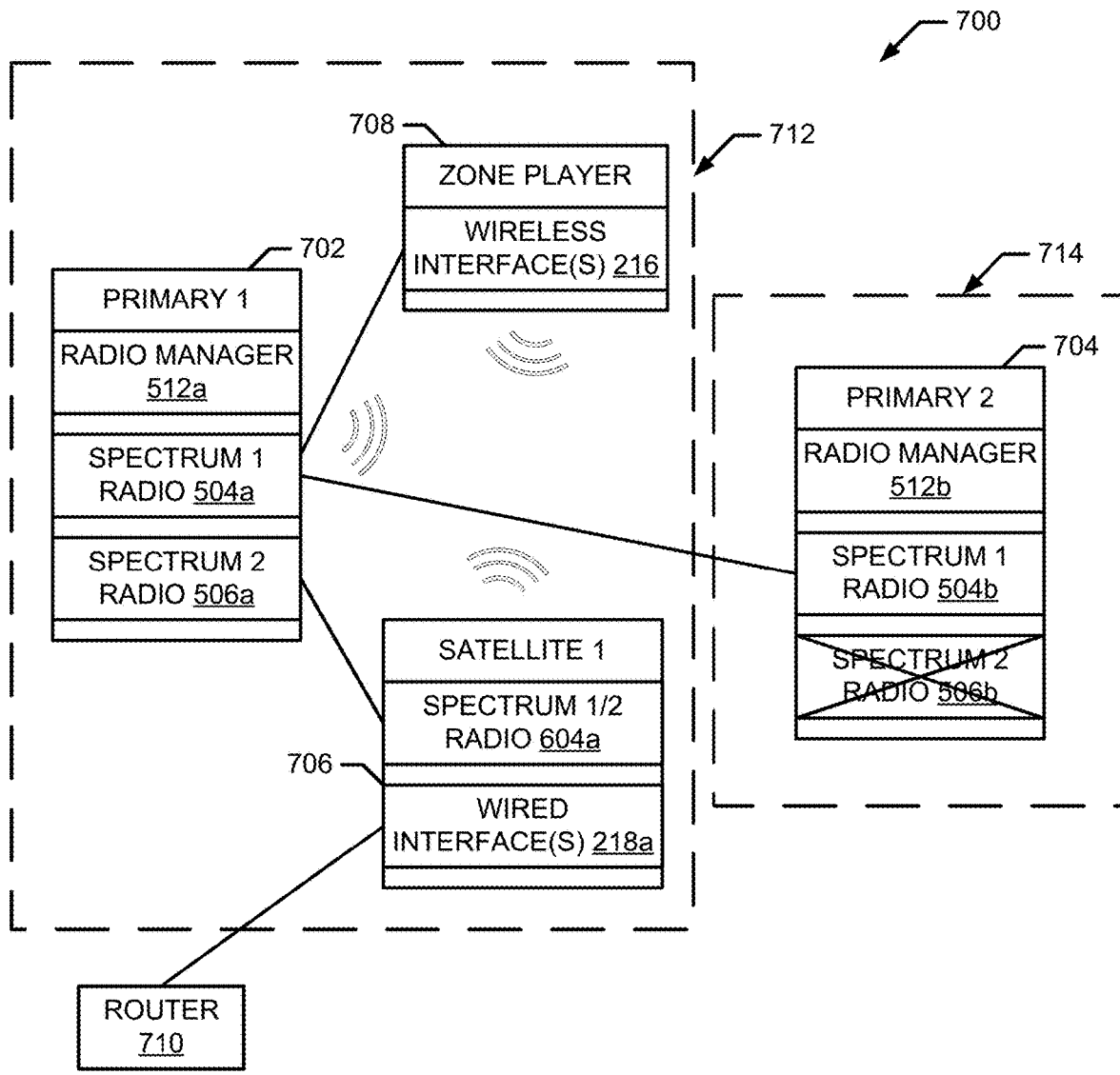
FIG. 7 shows a block diagram of an example zone player system including a first primary zone player acting as a stand-alone zone and a second primary zone player in a bonded group.

FIG. 7 shows a block diagram of an example media playback system 700 including multiple primary zone players 702, 704. The example primary zone players 702, 704 may each be implemented by the example primary zone player 500 of FIG. 5. The example primary zone players 702, 704 include respective first spectrum radios 504a, 504b (e.g., the first spectrum radio 504 of FIG. 5), second spectrum radios 506a, 506b (e.g., the second spectrum radio 506 of FIG. 5) and radio managers 512a, 512b (e.g., the radio manager 512 of FIG. 5).

The example media playback system 700 of FIG. 7 also includes a satellite zone player 706, which may be implemented by the example satellite zone player 600 of FIG. 6. The example satellite zone player 706 includes a switching spectrum radio 604a (e.g., the switching spectrum radio 604 of FIG. 6), which may be configured to communicate via the first spectrum or the second spectrum, and wired interface(s) 218a (e.g., the wired interface(s) 218 of FIGS. 2 and/or 6), which is communicatively coupled to a network router 710. The example satellite zone player 706 of FIG. 7 is receiving data from the network router 710. For example, the satellite zone player 706 may be streaming cloud-based audio via the network router 710. The example satellite zone player 706 is configured to communicate the data (e.g., audio information) received from the network router 710 via channels in the second spectrum (e.g., the 5 GHz spectrum).

The example media playback system 700 of FIG. 7 also includes a standard zone player 708. The example standard zone player 708 may be implemented by the example zone player 200 of FIG. 2. The example standard zone player 708 includes wireless interface(s) 216. In the illustrated example, the example wireless interface(s) 216 are configured to communicate via channels in the first spectrum (e.g., the 2.4 GHz spectrum).

In the illustrated example of FIG. 7, the zone players 702, 704, 706, 708 are grouped into two different zone groups 712, 714. The example first zone group 712 is a bonded zone including the primary zone player 702, the satellite zone player 706 and the standard zone player 708. The example second zone group 714 is a stand-alone zone including the primary zone player 704. In the illustrated example, the primary zone player 704 is a group master of the media playback system 700 and periodically communicates control information (e.g., configuration information, keep-alive probes, channel probes, power savings information, etc.) to the other zone players in the media playback system 700. For example, although the primary zone players 702, 704 are not part of the same zone group, the primary zone player 704 of FIG. 7 is configured to communicate configuration information to the primary zone player 702 via channels in the first spectrum (e.g., the 2.4 GHz spectrum).

In an example of operation, the satellite zone player 706 receives data (e.g., cloud-based audio content) from the network router 710 via the wired interface(s) 218a. The satellite zone player 706 simultaneously (or nearly simultaneously) streams the audio information to the primary zone player 702 via channels in the second spectrum (e.g., the 5 GHz spectrum). The primary zone player 706 may begin transmitting audio information to the standard zone player 708 via channels in the first spectrum (e.g., the 2.4 GHz spectrum).

The example radio managers 512a, 512b periodically check the usage of the wireless radios of the respective primary zone players 702, 704. For example, each of the radio managers 512a, 514b may check if power can be conserved by disabling one or more of the wireless radios of the respective primary zone player 702, 704. As described above, a radio manager disables a wireless radio when (1) the primary zone player is included in a bonded zone and (2) the bonded zone is not playing audio content and/or includes a satellite zone player that is not bridging traffic. Additionally or alternatively, the radio manager disables a wireless radio of the primary zone player when the primary zone player is not part of a bonded zone. In additional or alternative examples, the radio manager disables a wireless radio when the bonded zone includes an offline playback device (e.g., a playback device that is unplugged, inaccessible, etc.)

In the illustrated example of FIG. 7, the radio manager 512a of the primary zone player 702 determines whether the primary zone player 702 is in a bonded zone. For example, the primary zone player 702 may retrieve current zone group configuration information stored in memory (e.g., the memory 206 of FIGS. 2 and/or 5). Additionally or alternatively, the primary zone player 702 may request, via channels in the first spectrum, configuration information from the group master (e.g., the primary zone player 704). In the illustrated example, the configuration information indicates that the primary zone player 702 is part of the first bonded zone 712.

In response to determining that the primary zone player 702 is in a bonded zone (e.g., the bonded zone 712), the radio manager 512a determines whether the bonded zone 712 is currently playing audio content and/or a satellite zone player in the first bonded zone 712 is bridging traffic. For example, the radio manager 512a may check if the primary zone player 702 is receiving audio information (e.g., via an audio interface). In the illustrated example, the satellite zone player 706 is bridging traffic (e.g., receiving data from the network router 710). In addition, the bonded zone 712 is playing audio content (e.g., the cloud-based audio content received at the satellite zone player 706). Thus, the radio manager 512a of FIG. 5 does not disable either of the wireless radios 504a, 506a of the primary zone player 702.

The example radio manager 512b of the primary zone player 704 also checks whether the primary zone player 704 can conserve power by disabling a wireless radio. In the illustrated example, the radio manager 512b determines whether the primary zone player 702 is in a bonded zone. For example, the primary zone player 704 may retrieve current zone group configuration information stored in memory (e.g., the memory 206 of FIGS. 2 and/or 6). In the illustrated example, the configuration information processed by the primary zone player 704 indicates that, although the primary zone player 704 is in the zone group 714, the zone group 714 is not a bonded zone (e.g., is a stand-alone zone). Accordingly, the example radio manager 512b of FIG. 7 disables a wireless radio. In the illustrated example, as the primary zone player 704 is communicating control information to the primary zone player 702 via channels in the first spectrum, the radio manager 512b disables the second spectrum radio 506b (e.g., the 5 GHz spectrum).

Additionally or alternatively, the primary zone player 704 may be part of a bonded zone with another zone player that is offline (e.g., unplugged). In some such examples, the radio manager 512b manages the wireless radios using a similar approach as that employed when the primary zone player 704 is a stand-alone zone.

In response to disabling the second spectrum radio 506b, the radio manager 512b of FIG. 7 periodically (e.g., every three milliseconds, every three seconds, etc.) enables the second spectrum radio 606b and scans for unused channels in the second spectrum (e.g., the 5 GHz spectrum). For example, the radio manager 512b may update a table of used channels in the second spectrum (e.g., used by other playback devices in the playback system and/or other non-playback devices that operate using channels in the second spectrum) to reduce latency when beginning to playback audio content (e.g., may connect to an unused channel in the second spectrum upon startup). Additionally, the radio manager 612b determines if an "add satellite" command is received to form and/or join a bonded zone. The example radio manager 512b then disables the second spectrum radio 506b if an "add satellite" command is not received during a threshold time period that the second spectrum radio 506b was enabled.

Figure 8:
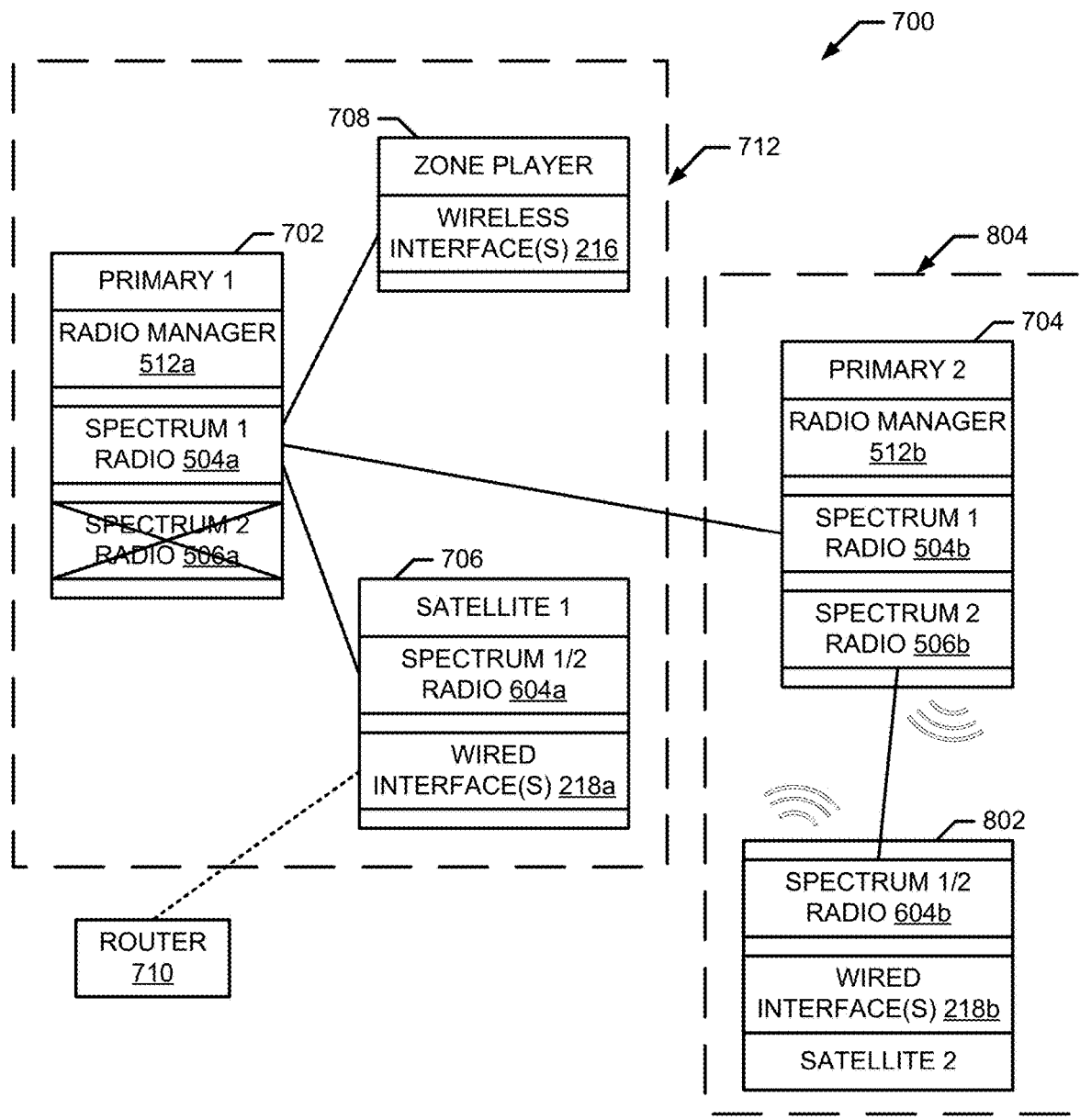
FIG. 8 shows the example zone player system of FIG. 7 when a satellite zone player has been grouped with the primary zone player acting as a stand-alone zone.

FIG. 8 shows the example media playback system 700 of FIG. 7 when a satellite zone player 802 has been added to the media playback system 700. The example satellite zone player 802 includes a switching spectrum radio 604b (e.g., the switching spectrum radio 604 of FIG. 6), which may be configured to communicate via the first spectrum or the second spectrum, and wired interface(s) 218b (e.g., the wired interface(s) 218 of FIGS. 2 and/or 6).

In the illustrated example, the satellite zone player 802 is grouped with the primary zone player 704 (e.g., an example bonded zone 804). For example, the satellite zone player 802 may be offline at a first time (e.g., unplugged) and then connect with the primary zone player 704 to re-establish the bonded zone 804 at a second time. Additionally or alternatively, the satellite zone player 802 may be a new satellite zone player first added to the media playback system 700 and then grouped with the primary zone player 704 to form the bonded zone 804 (e.g., identified via an "add satellites" command included in control information).

In an example of operation, the primary zone player 704 is communicating audio information to the satellite zone player 802 via channels in the second spectrum (e.g., the 5 GHz spectrum). The primary zone player 704 of FIG. 8 is also periodically (e.g., every three milliseconds, every three seconds, etc.) communicating control information (e.g., configuration information, keep-alive probes, channel probes, power savings information, etc.) to the primary zone player 702. Additionally or alternatively, the example primary zone player 704 may communicate control information with the primary zone player 702 aperiodically (e.g., upon request) and/or as a one-time event.

The example radio managers 512a, 512b periodically check the usage of the wireless radios of the respective primary zone players 702, 704. For example, a radio manager may disable a wireless radio when the wireless radio is not being used to communicate control information and/or audio information. In the illustrated example, the bonded zone 712 is not playing audio. For example, the satellite zone player 706 of the bonded zone 712 may stop receiving data from the network router 710 to forward to the primary zone player 702, a user may stop playback in the bonded zone 712 (e.g., via the controllers 126, 128 of FIG. 1 and/or the control device 300 of FIG. 3), the end of a playback queue may be reached, etc. The example radio manager 512a of the primary zone player 702 determines that, while the primary zone player 702 is part of the bonded zone 712, the bonded zone 712 is not playing audio and the satellite zone player 706 is not bridging traffic. As a result, the example radio manager 512a disables the second spectrum radio 506a. The radio manager 512a also communicates power savings information to the satellite zone player 706 indicating that the second spectrum radio 506a is disabled. In the illustrated example, the example satellite zone player 706 determines whether the satellite zone player 706 is communicating with the primary zone player 702 via channels in the second spectrum (e.g., the 5 GHz spectrum) and, as a result, the satellite zone player 706 switches to communicating via channels in the first spectrum (e.g., the 2.4 GHz spectrum). The example radio manager 512a then waits for an indication that the satellite zone player 706 begins bridging traffic and/or that the bonded zone 712 begins playing audio content (e.g., via a play command included in audio information originated by the control devices 126, 128, 300, by a zone player in the bonded group 712, by the group master (e.g., the primary zone player 704) and/or via a signal detected by the audio interface(s) 510 of FIG. 5).

The example radio manager 512*b* of the primary zone player 704 determines whether the primary zone player 704 is included in a bonded zone. For example, the radio manager 512*b* may retrieve saved and/or current zone group configuration information (e.g., from the memory 206 of FIGS. 2 and/or 5). In the illustrated example, the saved and/or current zone group information indicates that the primary zone player 704 is part of the bonded zone 804. The example radio manager 512*b* then determines whether the bonded zone 804 is playing audio content and/or the satellite zone player 802 is bridging traffic. In the illustrated example, the bonded zone 804 is playing audio content. As a result, the example radio manager 512*b* does not disable either of the wireless radios of the primary zone player 704.

While an example manner of implementing the primary zone player 500 is illustrated in FIG. 5, and an example manner of implementing the satellite zone player 600 is illustrated in FIG. 6, one or more of the elements, processes and/or devices illustrated in FIGS. 5 and 6 may be combined, divided, re-arranged, omitted, eliminated and/or implemented in any other way. Further, the example processor 202, the example software components 204, the example memory 206, the example audio processing components 208, the example audio amplifier(s) 210, the example speaker(s) 212, the example first spectrum radio 504, the example second spectrum radio 506, the example control interface(s) 508, the example audio interface(s) 510, the example radio manager 512, the example switching spectrum radio 604, the example control interface(s) 606, the example audio interface(s) 608, the example spectrum selector 610, and/or more generally, the example primary zone player 500 of FIG. 5 and/or the example satellite zone player 600 of FIG. 6 may be implemented by hardware, software, firmware and/or any combination of hardware, software and/or firmware.

Thus, for example, any of the example processor 202, the example software components 204, the example memory 206, the example audio processing components 208, the example audio amplifier(s) 210, the example speaker(s) 212, the example first spectrum radio 504, the example second spectrum radio 506, the example control interface(s) 508, the example audio interface(s) 510, the example radio manager 512, the example switching spectrum radio 604, the example control interface(s) 606, the example audio interface(s) 608, the example spectrum selector 610, and/or more generally, the example primary zone player 500 of FIG. 5 and/or the example satellite zone player 600 of FIG. 6 be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)).

When reading any of the apparatus or system claims of this patent to cover a purely software and/or firmware implementation, at least one of the example processor 202, the example software components 204, the example memory 206, the example audio processing components 208, the example audio amplifier(s) 210, the example speaker(s) 212, the example first spectrum radio 504, the example second spectrum radio 506, the example control interface(s) 508, the example audio interface(s) 510, the example radio manager 512, the example switching spectrum radio 604, the example control interface(s) 606, the example audio interface(s) 608, the example spectrum selector 610, and/or more generally, the example primary zone player 500 of FIG. 5 and/or the example satellite zone player 600 of FIG. 6 is/are hereby expressly defined to include a tangible computer readable storage device or storage disk such as a memory, a digital versatile disk (DVD), a compact disk (CD), a Blu-ray disk, etc. storing the software and/or firmware. Further still, the example primary zone player 500 of FIG. 5 and/or the example satellite zone player 600 of FIG. 6 may include one or more elements, processes and/or devices in addition to, or instead of, those illustrated in FIGS. 5 and 6, and/or may include more than one of any or all of the illustrated elements, processes and devices.

Figure 9:
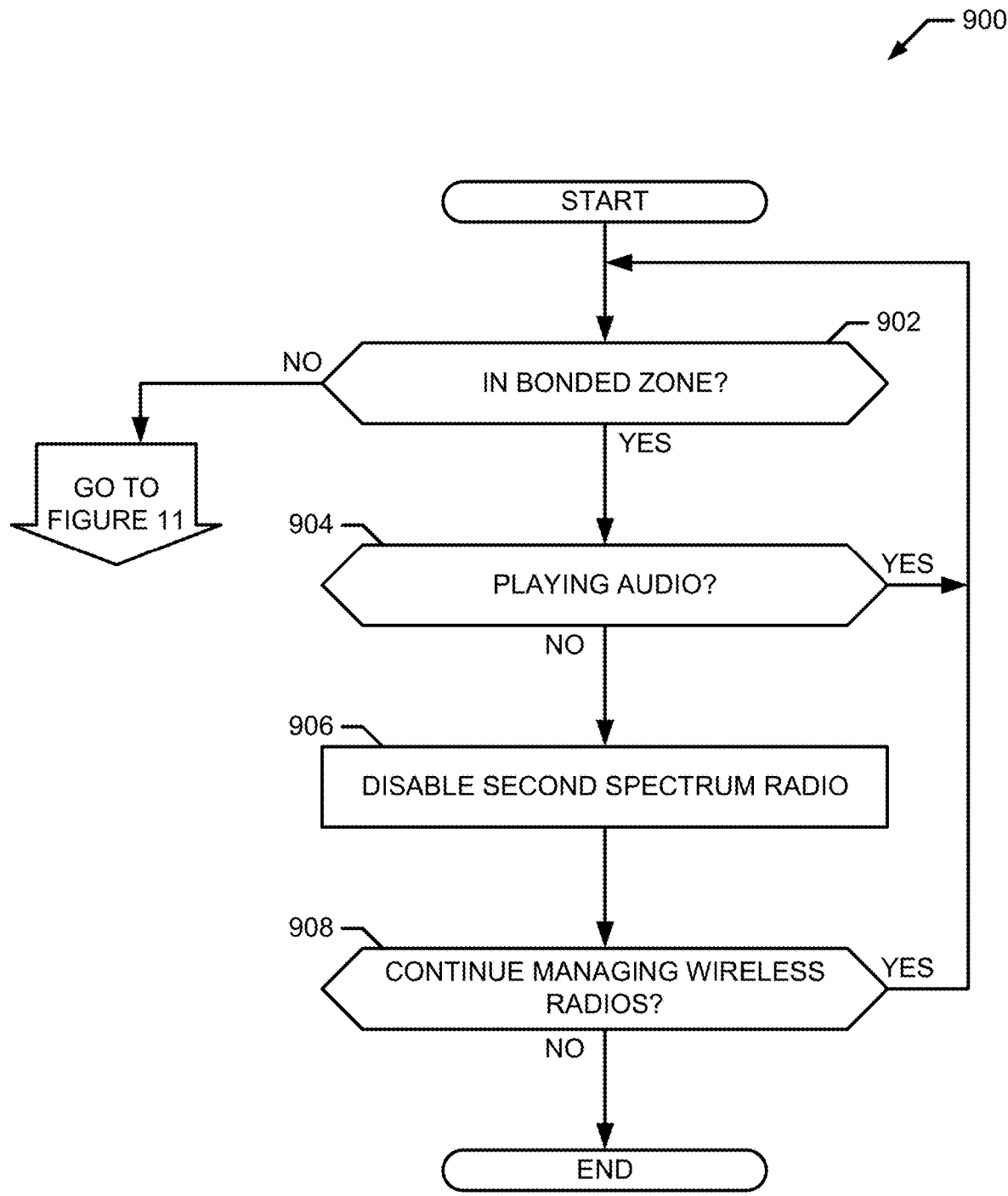
FIGS. 9-11 show flowcharts representative of example methods to manage wireless radios in a playback device.
Figure 10:
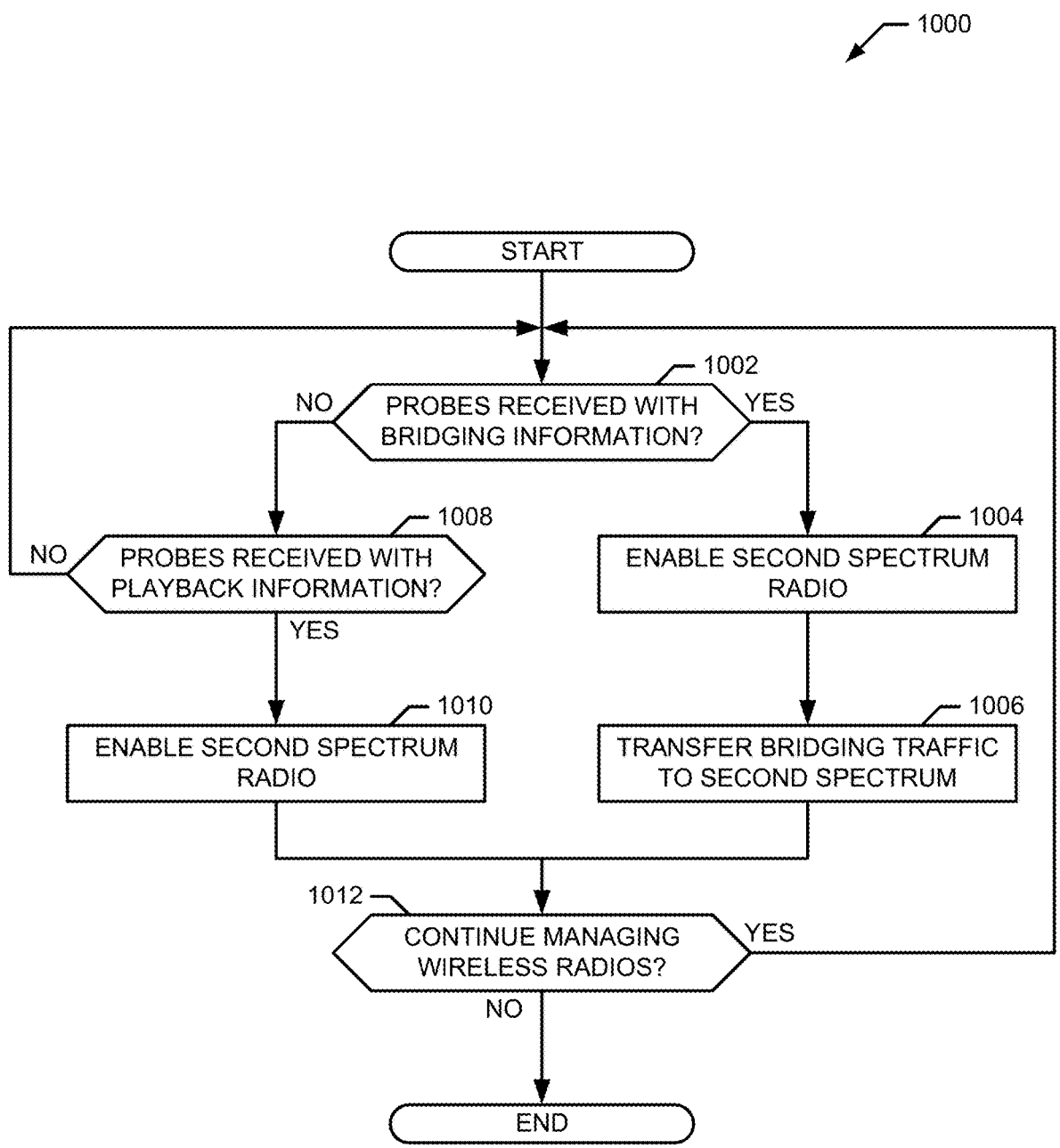

Flowcharts representative of example machine readable instructions for implementing the primary zone player 500 of FIG. 5 are shown in FIGS. 9, 10 and/or 11. A flowchart representative of example machine readable instructions for implementing the satellite zone player 600 of FIG. 6 is shown in FIG. 12. In these examples, the machine readable instructions comprise a program for execution by a processor such as the processor 202 shown in the example zone player 200 discussed above in connection with FIG. 2. The programs may be embodied in software stored on a tangible computer readable storage medium such as a CD-ROM, a floppy disk, a hard drive, a digital versatile disk (DVD), a Blu-ray disk, or a memory associated with the processor 202, but the entire program and/or parts thereof could alternatively be executed by a device other than the processor 202 and/or embodied in firmware or dedicated hardware. Further, although the example programs are described with reference to the flowcharts illustrated in FIGS. 9-12, many other methods of implementing the example primary zone player 500 and/or the satellite zone player 600 may alternatively be used. For example, the order of execution of the blocks may be changed, and/or some of the blocks described may be changed, eliminated, or combined.

As mentioned above, the example processes of FIGS. 9-12 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 9-12 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 9 shows a flowchart representative of an example method 900 to manage wireless radios in a playback device. The example method 900 may be performed by any of the example primary zone players 500, 702 and/or 704 of FIGS. 7, 8 and/or 8.

The example method 900 of FIG. 9 may be performed periodically, aperiodically or as a one-time event. The method 900 begins at block 902 when the example primary zone player 500 determines whether the primary zone player 500 is included in a bonded zone. For example, the control interface(s) 508 may request current configuration zone group information from a group master. If, at block 902, the example control interface(s) 508 determine that the primary zone player 500 is not part of a bonded zone, control proceeds to the example method 1100 of FIG. 11.

If, at block 902, the example control interface(s) 508 determine that the primary zone player 500 is part of a bonded zone, then, at block 904, the primary zone player 500 determines whether the bonded zone is playing audio. For example, the example radio manager 512 may check whether the example audio interface(s) 510 are receiving audio information (e.g., from a satellite zone player, a detected signal, etc.). If, at block 904, the example radio manager 512 determines that the bonded zone is playing audio, then control returns to block 902 to wait and determine whether the primary zone player 500 is part of a bonded zone.

If, at block 904, the example radio manager 512 determines that the bonded zone is not playing audio, then, at block 906, the radio manager 512 disables a wireless radio included in the primary zone player 500 to conserve power. For example, the radio manager 512 may disable the second spectrum radio (e.g., the 5 GHz spectrum). In some examples, the radio manager 512 may transmit control information (e.g., power savings information) to other zone players in the bonded zone indicating that the second spectrum radio has been disabled.

In some examples, when the radio manager 512 determines that the bonded zone is not playing audio content, the radio manager 512 determines whether a satellite zone player in the bonded zone is bridging traffic. If the radio manager 512 determines that the bonded zone does not include a satellite zone player bridging traffic, then control proceeds to block 908. Otherwise, control returns to block 902 to wait and determine whether the primary zone player 500 is part of a bonded zone.

At block 908, the example primary zone player 500 determines whether to continue managing the wireless radios. For example, the primary zone player 500 may receive a power-off command, may include a timer to periodically manage the wireless radios, etc. If, at block 908, the primary zone player 500 determines that it is to continue managing the wireless radios (e.g., a timer is reset and the primary zone player 500 periodically performs the power conserving techniques disclosed herein), then control returns to block 902 to wait and determine whether the primary zone player 500 is part of a bonded zone.

If, at block 908, the example primary zone player 500 determines to not continue managing the wireless radios (e.g., a power-off command is received), then the example method 900 of FIG. 9 ends.

FIG. 10 shows a flowchart representative of an example method 1000 to manage wireless radios in a playback device. The example method 1000 may be performed by any of the example primary zone players 500, 702 and/or 704 of FIGS. 5, 7 and/or 8.

The example method 1000 of FIG. 10 may be performed when a bonded playback device has a disabled wireless radio. The method 1000 begins at block 1002 when the example primary zone player 500 determines whether a received probe includes bridging information. For example, the radio manager 512 may check control information received at the control interface(s) 508 (e.g., that originated at the controllers 126, 128, 300, a zone player in the bonded zoned, another zone player that is a group master, etc.) for bridging information indicating that a satellite zone player in the bonded zone is bridging traffic.

If, at block 1002, the radio manager 512 determines that the bonded zone includes a satellite zone player bridging traffic, then, at block 1004, the radio manager 512 enables the disabled wireless radio (e.g., the second spectrum radio 506). At block 1006, the radio manager 512 transfers the bridging traffic to the second spectrum radio 506. The radio manager 512 may transfer the bridging traffic in accordance with the teachings of Beckhardt et al., U.S. patent application Ser. No. 13/524,808, for example.

If, at block 1002, the radio manager 512 determines that the bonded zone does not include a satellite zone player bridging traffic, then, at block 1008, the primary zone player 500 determines whether a received probe includes playback information. For example, the control interface 508 may receive audio information (e.g., a playback command) including a command to play audio content, which originated at the controllers 126, 128, 300, a zone player in the bonded zoned, another zone player that is a group master, etc. Additionally or alternatively, the audio interface(s) 510 may detect a signal (e.g., via a line-out connection (e.g., RCA or optical output, TOSlink, etc.)) and/or receive audio information.

If, at block 1008, the primary zone player 500 determines that the received probe did not include audio information, then control returns to block 1002 and waits to receive another probe. If, at block 1008, the primary zone player 500 determines that the received probe did include playback information (e.g., a play command), then, at block 1010, the radio manager 512 enables the disabled second spectrum radio 506.

After the radio manager 512 transfers the bridging traffic to the second spectrum radio 506 at block 1006 or after the radio manager 512 enables the second wireless radio 506 at block 1010, then, at block 1012, the example primary zone player 500 determines whether to continue managing the wireless radios. For example, the primary zone player 500 may receive a power-off command, may include a timer to periodically manage the wireless radios, etc. If, at block 1012, the primary zone player 500 determines to continue managing the wireless radios (e.g., a timer is reset and the primary zone player 500 periodically performs the power conserving techniques disclosed herein), then control returns to block 1002 to wait and to receive a probe.

If, at block 1012, the example primary zone player 500 determines to not continue managing the wireless radios (e.g., a power-off command is received), then the example method 1000 of FIG. 10 ends.

Figure 11:
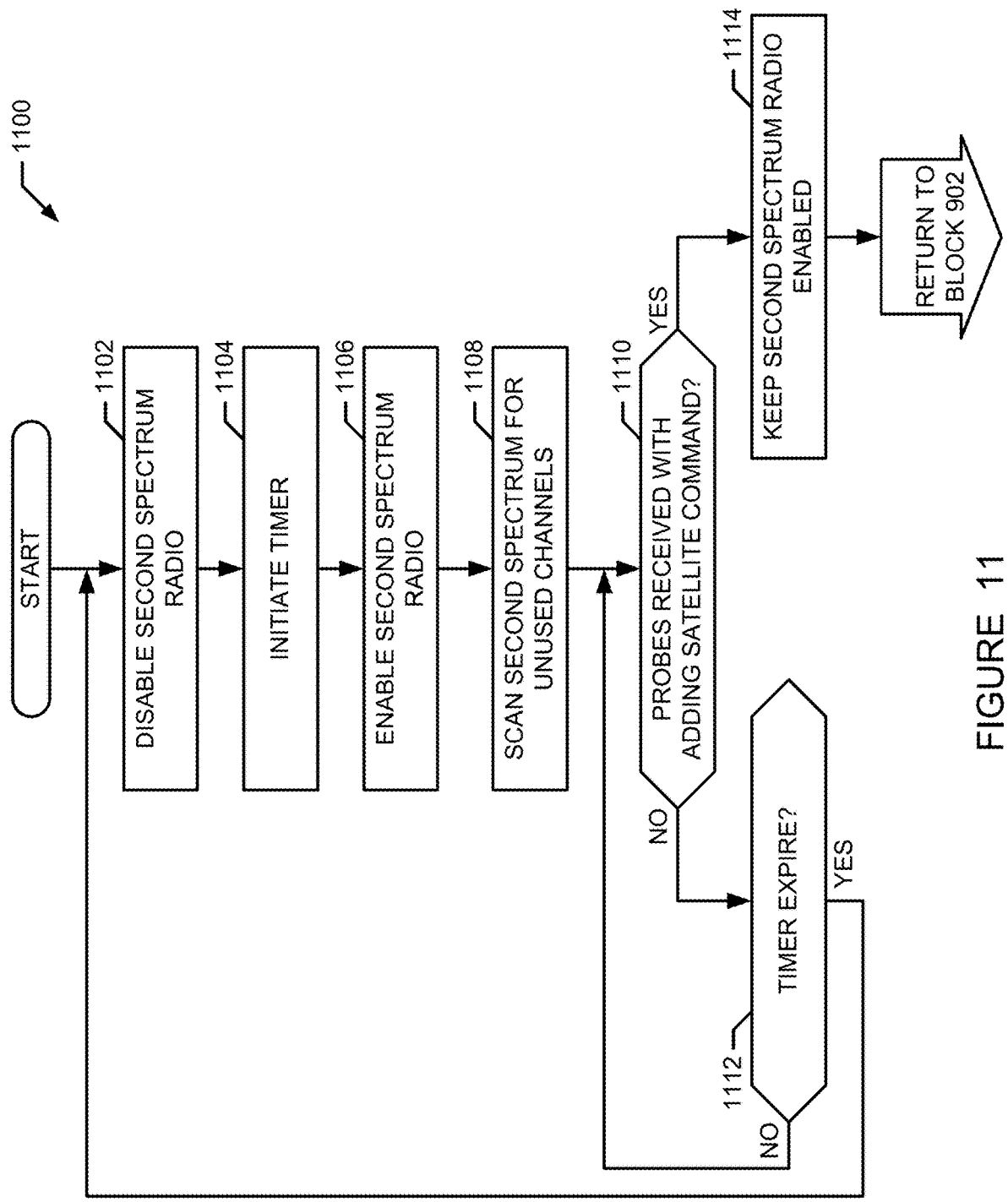
Figure 12:
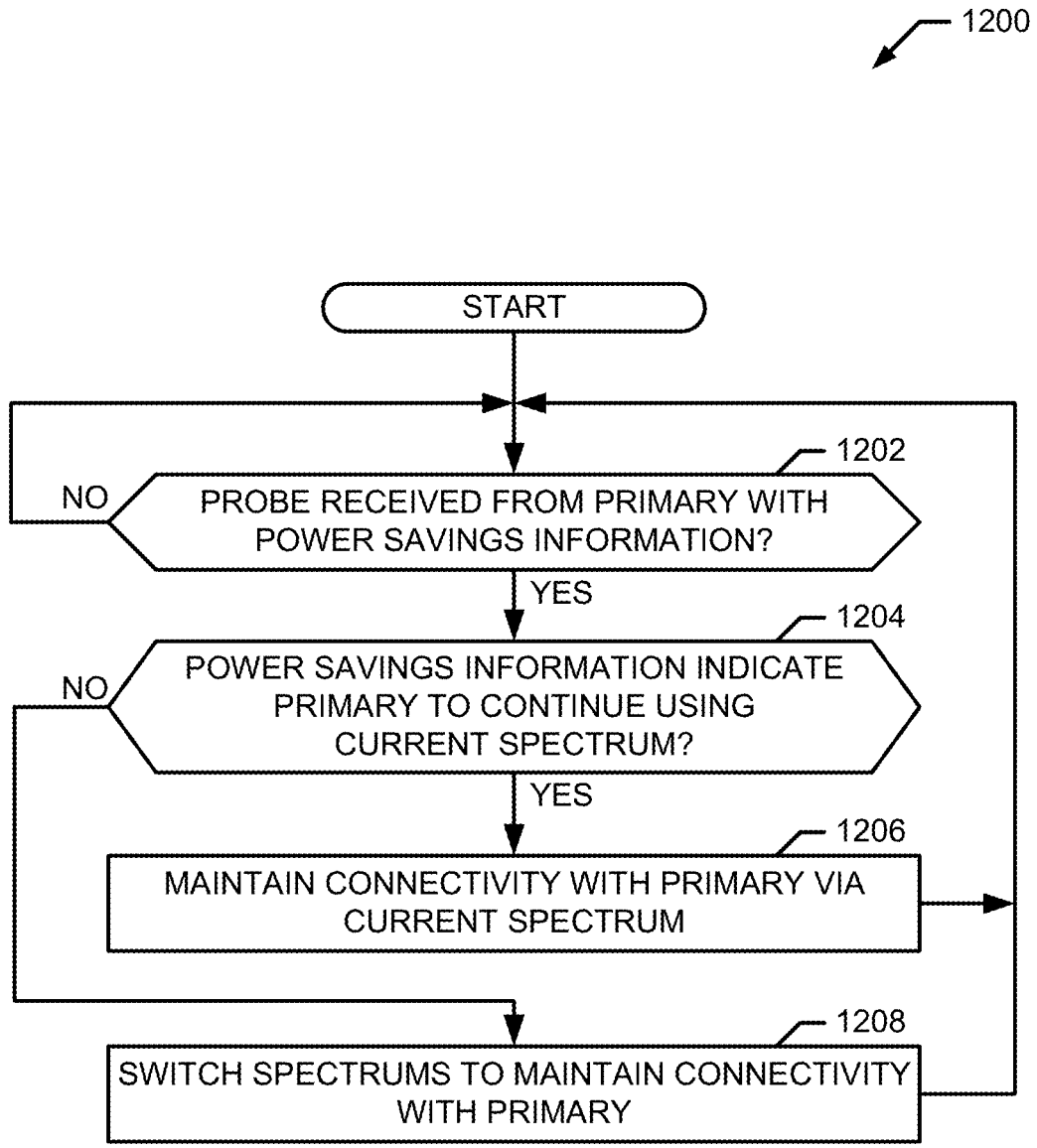
FIG. 12 show a flowchart representative of an example method to manage switching wireless radios of a playback device in a bonded zone.

FIG. 11 shows a flowchart representative of an example method 1100 to manage wireless radios in a playback device. The example method 1100 may be performed by any of the example primary zone players 500, 702 and/or 704 of FIGS. 5, 7 and/or 8.

The example method 1100 of FIG. 11 may be performed when a determination is made that the playback device is not at a bonded zone (e.g., at block 902 of FIG. 9). The method 1100 begins at block 1102 when the example primary zone player 500 disables a wireless radio. For example, the radio manager 512 may disable the second spectrum radio 506. At block 1104, the primary zone player 500 initiates a timer. At block 1106, the primary zone player 500 enables the disabled wireless radio. For example, the radio manager 512 enables the second spectrum radio 506. At block 1108, the primary zone player 500 scans the second spectrum for unused channels.

At block 1110, the example primary zone player 500 determines whether a probe was received including a command to add a satellite zone player. For example, the control interface 508 may determine that control information that originated at a controller 126, 128, 300, a group master, and/or a satellite zone player includes an "add satellite" command. If, at block 1110, the control interface(s) 508 determine that an "add satellite" command was not received, then, at block 1112, the primary zone player 500 determines whether a threshold time passed and the timer expired.

If, at block 1112, the primary zone player 500 determines that the timer has not expired, control returns to block 1110 to wait and determine whether another received probe includes an "add satellite" command. If, at block 1112, the primary zone player 500 determines that the timer has expired (e.g., a threshold time has passed), then control returns to block 1102 and the second spectrum radio 506 is disabled.

If, at block 1110, the control interface(s) 508 determine that an "add satellite" command was received, then, at block 1114, the radio manager 512 does not disable the second spectrum radio 506. In some examples, the primary zone player 500 searches for the satellite zone player to add and adds the satellite zone player in accordance with the teachings of Beckhardt et al., U.S. patent application Ser. No. 13/524,808. Control then returns to block 902 of FIG. 9 to determine whether the primary zone player is included in a bonded zone.

FIG. 12 shows a flowchart representative of an example method 1200 to manage a switching spectrum radio in a playback device. The example method 1200 may be performed by any of the example satellite zone players 600, 706 and/or 802 of FIGS. 6, 7 and/or 8.

The example method 1200 of FIG. 12 may be performed by the satellite zone player 600 when a probe including control information is obtained. The method 1200 begins at block 1202 when the example satellite zone player 600 receives a probe from a primary zone player that is grouped with the satellite zone player 600 (e.g., is in a bonded zone). For example, the satellite zone player 600 may receive control information from the primary zone player 500 of FIGS. 5, 7 and/or 8 via channels in the first spectrum (e.g., the 2.4 GHz spectrum). If, at block 1202, the example satellite zone player 600 determines that the probe does not include power savings information, the control returns to block 1202 and waits to receive another probe.

If, at block 1202, the satellite zone player 600 determines that the probe does include power savings information, then, at block 1204, the satellite zone player 600 determines whether the power savings information indicates that the primary zone player 500 is to continue using the current spectrum (e.g., the first spectrum). For example, the power savings information may indicate that the primary zone player 500 is disabling its first spectrum radio 504 and/or its second spectrum radio 506.

If, at block 1204, the satellite zone player 600 determines that the primary zone player 500 is continuing to use the current spectrum, then, at block 1206, the satellite zone player 600 maintains connectivity with the primary zone player 500 via the current spectrum (e.g., the first spectrum). For example, the satellite zone player 600 may acknowledge the probe by transmitting an acknowledgment message to the primary zone player 500 via channels in the same spectrum. Control then returns to block 1202 to wait to receive another probe from the primary zone player 500.

If, at block 1204, the satellite zone player 600 determines that the primary zone player 500 is not to continue using the current spectrum, then, at block 1208, the satellite zone player 600 switches spectrums to maintain connectivity with the primary zone player 500. For example, the spectrum selector 710 may switch the switching spectrum radio 704 from communicating via channels in the first spectrum to communicating via channels in the second spectrum. In some examples, the satellite zone player 600 may acknowledge receiving the power savings information by transmitting an acknowledgment message to the primary zone player 500 via channels in the new spectrum (e.g., the second spectrum). Control then returns to block 1202 to wait to receive another probe from the primary zone player 500.

Figure 13:
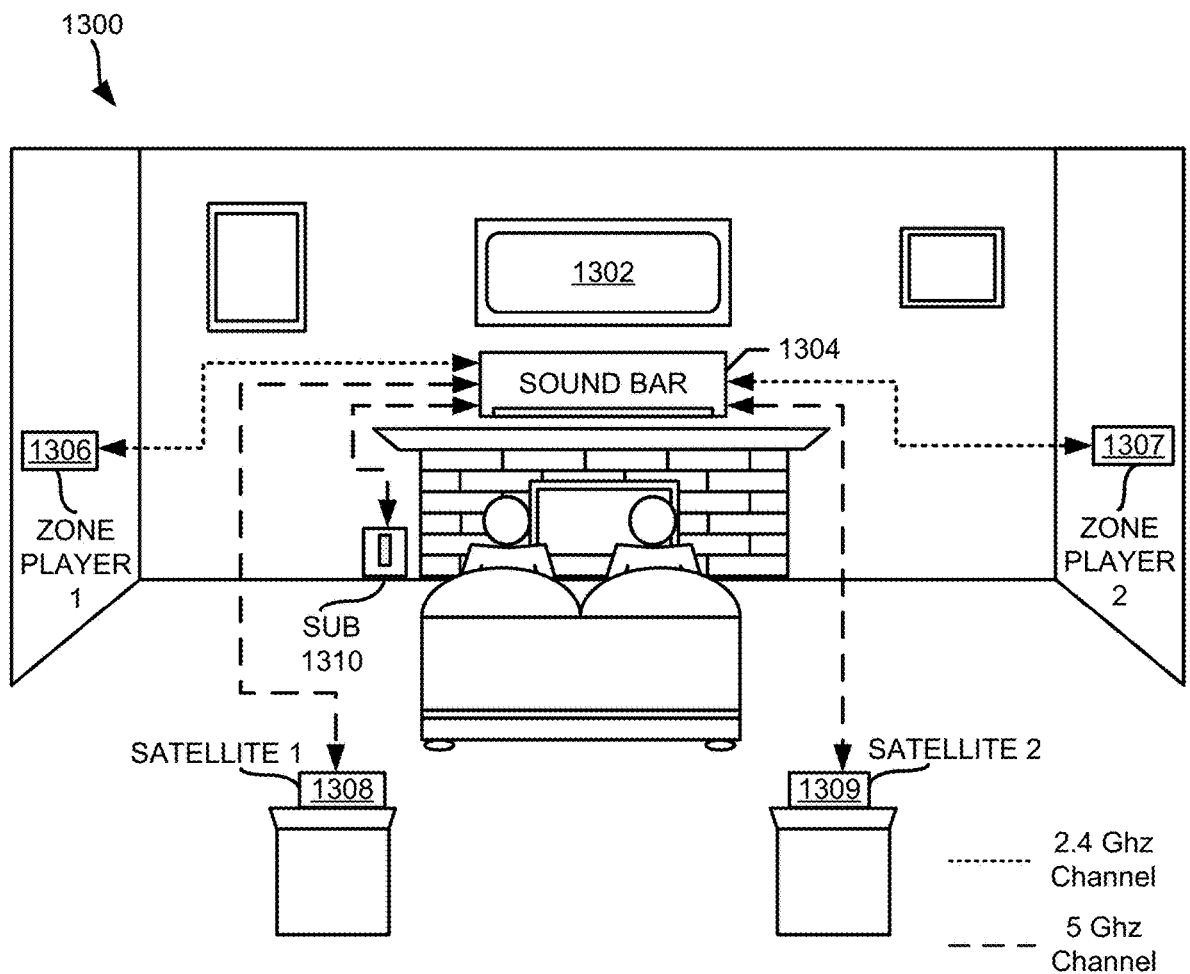
FIG. 13 shows an example environment in which certain embodiments may be practiced.

As an illustrative example, FIG. 13 shows an example environment 1300 (e.g., a home theater system) in which certain embodiments may be practiced. The example environment 1300 includes a television 1302 and a primary zone player 1304 (e.g., a sound bar). The sound bar 1304 communicates with (e.g., transmits information to and/or receives information from) other zone players in the home theater system via first channels in a first wireless spectrum (e.g., the 2.4 GHz spectrum) and/or via second channels in a second wireless spectrum (e.g., the 5 GHz spectrum). In the illustrated example, example zone players 1306, 1307 include a wireless interface to communicate with the sound bar 1304 via first channels in the first wireless spectrum. Example satellite speakers 1308, 1309 and example subwoofer 1310 include a switching spectrum radio that communicates with the sound bar 1304 via the first wireless spectrum or the second wireless spectrum.

In an example of operation, the sound bar 1304 initially (e.g., on startup, on adding a satellite zone player to the home theater system, etc.) communicates with the satellite speakers 1308, 1309 and the subwoofer 1310 via the first wireless spectrum (e.g., the 2.4 GHz spectrum). For example, during configuration of the home theater zone, the home theater zone is not playing audio content and the sound bar 1304 transmits control information to the zone players 1306, 1307, the satellite speakers 1308, 1309 and the subwoofer 1310 via a selected channel in the first wireless spectrum.

The example sound bar 1304 periodically performs power savings checks to determine whether power can be conserved by disabling a wireless radio (e.g., the second spectrum radio). For example, the sound bar 1304 may determine whether the sound bar 1304 is included in a bonded zone (e.g., the home theater zone). In response to determining that the sound bar 1304 is part of a bonded zone (e.g., the home theater zone), the sound bar 1304 determines whether the bonded zone is playing audio.

Additionally or alternatively, the sound bar 1304 may determine whether a satellite speaker 1308, 1309 and/or the subwoofer 1310 is bridging traffic. While the bonded zone is not playing audio and/or the satellite speakers 1308, 1309 and/or the subwoofer 1310 are not bridging traffic, the sound bar 1304 disables the second wireless radio and continues communicating with the satellite speakers 1308, 1309 and the subwoofer 1310 via the first spectrum. The example sound bar 1304 then monitors communications via the first spectrum for audio information indicating a play command to begin playing audio has been received (e.g., via the zone players 1306, 1307, the satellite speakers 1308, 1309 and/or the subwoofer 1310) and/or control information indicating that a satellite speaker 1308, 1309 and/or the subwoofer 1310 is bridging traffic.

When the sound bar 1304 detects such control information, the example sound bar 1304 enables the second spectrum radio and begins communicating with the satellite speakers 1308, 1309 and the subwoofer 1310 via channels in the second spectrum (e.g., the 5 GHz spectrum). For example, in response to a play command detected in audio information, the sound bar 1304 may begin transmitting speaker specific audio information to the zone players 1306, 1307 via the first spectrum (e.g., left surround channel audio to the zone player 1306 configured as a front-left surround speaker and right surround channel audio to the zone player 1307 configured as a front-right surround speaker), and transmit speaker specific audio information to the satellite speakers 1308, 1309 and the subwoofer 1310 via the second spectrum (e.g., left surround channel audio to the satellite speaker 1308 configured as a rear-left surround speaker, right surround channel audio to the satellite speaker 1309 configured as a rear-right surround speaker and low-frequency channel audio to the subwoofer 1310). The example sound bar 1304 may continue periodically performing power savings checks to determine whether power can be conserved by disabling a wireless radio (e.g., when audio playback is stopped, the satellite speakers 1308, 1309 and/or the subwoofer 1310 stops bridging traffic, the sound bar 1304 is removed from the home theater zone configuration, etc.).

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

The playback device includes an audio interface to communicate audio information. The playback device also includes a radio manager to determine, while the playback device is in a bonded zone, that the playback device is not playing audio based on the audio information, and the radio manager to disable communicating via a wireless radio when the playback device is not playing audio.

In some embodiments, the audio information includes audio content, and the radio manager is to determine that the playback device is playing audio when the playback device is playing the audio content.

In some embodiments, the radio manager is to determine that the playback device is playing audio when the audio information includes a play command.

In some disclosed examples, the play command is received at a second playback device included in the bonded zone.

In some disclosed examples, the play command is received at a third playback device not included in the bonded zone.

In some disclosed examples, the audio interface is a line-out connection, and the radio manager is to determine that the playback device is playing audio when the audio interface receives a signal.

In some embodiments, the playback device further includes a control interface to communicate control information via a second wireless radio, the second wireless radio to operate via a wireless spectrum different than the wireless radio, and the radio manager is to determine that the playback device is in a bonded zone based on the control information.

In some disclosed examples, the audio interface is to communicate the audio information via the second wireless radio.

In some disclosed examples, the audio interface is to communicate the audio information via the wireless radio, and the radio manager is to, when the playback device is not playing audio, update the audio interface to communicate the audio information via the second wireless radio, and to disable communicating via the wireless radio.

In another aspect, a method of managing a wireless radio of a playback device is provided. The method involves communicating audio information via an audio interface, identifying, while the playback device is in a bonded zone, that the playback device is not playing audio based on the audio information, and disabling communicating via the wireless radio when the playback device is not playing audio.

In some embodiments, identifying that the playback device is playing audio includes determining that the playback device is playing audio content included in the audio information.

In some embodiments, the identifying that the playback device is playing audio includes determining that the audio information includes a play command.

In some disclosed examples, the play command is communicated with a controller or the play command is communicated with a second playback device.

In some embodiments, the identifying that the playback device is playing audio includes obtaining a signal via a line-out connection.

In some embodiments, the bonded zone includes the playback device and a second playback device, the method further including disabling the wireless radio when the second playback device is offline.

In some disclosed examples, the bonded zone includes a third playback device, the method further including disabling the wireless radio when the second playback device and the third playback device are offline.

In still other examples, the method further involves enabling the wireless radio in response to control information, obtained via a second wireless radio, indicating that a second playback device included in the bonded zone is bridging traffic, and transferring the bridging traffic to the wireless radio.

In other disclosed examples, the method further involves disabling the wireless radio when the playback device is not in a bonded zone, initiating a timer, enabling the wireless radio, updating a list of wireless channels accessed via the wireless radio, and disabling the wireless radio when (1) the playback device did not receive control information to add the playback device to the bonded zone via a second wireless radio and (2) the timer expires.

In yet another aspect, a non-transitory computer readable medium having instructions stored thereon is provided. The instructions are executable by a computing device to cause the computing device to perform functions including determining a playback device is in a bonded zone based on control information communicated via a first wireless spectrum, determining that the playback device is playing audio based on audio information communicated via an audio interface, the audio information to include at least one of audio content, a play command obtained at a controller, a play command obtained at a bonded playback device grouped with the playback device, a play command obtained at a non-bonded playback device or a signal obtained via a line-out connection, and, in response to determining that the playback device is not playing audio, updating the audio interface to communicate via the first wireless spectrum when the audio interface is arranged to communicate via a second wireless spectrum different than the first wireless spectrum, and disabling communicating via the second wireless spectrum.

In some disclosed embodiments, the audio information includes at least audio content, a playback command indicative of a play command obtained at a controller, a playback command indicative of a play command obtained at a bonded playback device grouped with the playback device, a playback command indicative of a play command obtained at a non-bonded playback device, and obtaining a signal via a line-out connection.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A playback device comprising:
   a first spectrum radio for communication via a first wireless spectrum;
   a second spectrum radio for communication via a second wireless spectrum;
   at least one processor;
   at least one non-transitory computer-readable medium; and
   program instructions stored on the at least one non-transitory computer-readable medium that are executable by the at least one processor such that the playback device is configured to:
      operate in a first mode in which the first spectrum radio is enabled and the second spectrum radio is disabled;
      while operating in the first mode, receive a command to join a synchrony group with a display device and at least one additional playback device that is playing back audio content;
      based on the command, begin to operate in a second mode in which the second spectrum radio is enabled;
      receive the audio content for playback, wherein the audio content corresponds to video content being displayed at a display device; and
      using the second spectrum radio, coordinate with the synchrony group to take over, from the at least one additional playback device, playing back the audio content in synchrony with the video content.

2. The playback device of claim 1, wherein the playback device comprises a wearable device.

3. The playback device of claim 1, wherein the first wireless spectrum is a wireless spectrum in accordance with IEEE 802.15 communication standards.

4. The playback device of claim 1, wherein the second wireless spectrum is a wireless spectrum in accordance with IEEE 802.11 communication standards.

5. The playback device of claim 1, wherein the program instructions stored on the at least one non-transitory computer-readable medium that are executable by the at least one processor such that the playback device is configured to receive the command to join the synchrony group with the display device and the at least one additional playback device that is playing back the audio content comprise program instructions stored on the at least one non-transitory computer-readable medium that are executable by the at least one processor such that the playback device is configured to:
   receive, from a control device, the command to join the synchrony group with the display device and the at least one additional playback device that is playing back the audio content.

6. The playback device of claim 1, wherein the at least one additional playback device includes a second playback device, and wherein the program instructions stored on the at least one non-transitory computer-readable medium that are executable by the at least one processor such that the playback device is configured to receive the audio content for playback comprise program instructions stored on the at least one non-transitory computer-readable medium that are executable by the at least one processor such that the playback device is configured to:
   receive, from the second playback device, the audio content and playback timing information.

7. The playback device of claim 1, further comprising program instructions stored on the at least one non-transitory computer-readable medium that are executable by the at least one processor such that the playback device is configured to:
  receive a command to leave the synchrony group with the display device and the at least one addition playback device; and
  based on the command, disable the second spectrum radio.

8. The playback device of claim 7, wherein the program instructions that are executable by the at least one processor such that the playback device is configured to disable the second spectrum radio comprise program instructions that are executable by the at least one processor such that the playback device is configured to:
  turn off the second spectrum radio and thereby disable the second spectrum radio from transmitting or receiving information via the second wireless spectrum.

9. The playback device of claim 7, wherein the program instructions that are executable by the at least one processor such that the playback device is configured to receive the command to leave the synchrony group with the display device and the at least one additional playback device comprise program instructions that are executable by the at least one processor such that the playback device is configured to:
  receive, from a controller device, the command to leave the synchrony group with the display device and the at least one additional playback device.

10. At least one non-transitory computer-readable medium, wherein the at least one non-transitory computer-readable medium is provisioned with program instructions that, when executed by at least one processor, cause a playback device comprising a first spectrum radio for communication via a first wireless spectrum and a second spectrum radio for communication via a second wireless spectrum to:
  operate in a first mode in which the first spectrum radio of the playback device is enabled and the second spectrum radio of the playback device is disabled;
  while operating in the first mode, receive a command to join a synchrony group with a display device and at least one additional playback device that is playing back audio content;
  based on the command, begin to operate in a second mode in which the second spectrum radio is enabled;
  receive the audio content for playback, wherein the audio content corresponds to video content being displayed at a display device; and
  using the second spectrum radio, coordinate with the synchrony group to take over, from the at least one additional playback device, playing back the audio content in synchrony with the video content.

11. The at least one non-transitory computer-readable medium of claim 10, wherein the playback device comprises a wearable device.

12. The at least one non-transitory computer-readable medium of claim 10, wherein the first wireless spectrum is a wireless spectrum in accordance with IEEE 802.15 communication standards.

13. The at least one non-transitory computer-readable medium of claim 10, wherein the second wireless spectrum is a wireless spectrum in accordance with IEEE 802.11 communication standards.

14. The at least one non-transitory computer-readable medium of claim 10, wherein the program instructions that, when executed by at least one processor, cause the playback device to receive the command to join the synchrony group with the display device and the at least one additional playback device comprise program instructions that, when executed by at least one processor, cause the playback device to:
  receive, from a control device, the command to join the synchrony group with the display device and the at least one addition playback device.

15. The at least one non-transitory computer-readable medium of claim 10, wherein the at least one additional playback device includes a second playback device, and wherein the program instructions that, when executed by at least one processor, cause the playback device to receive the audio content for playback comprise program instructions that, when executed by at least one processor, cause the playback device to:
  receive, from the second playback device, the audio content and playback timing information.

16. The at least one non-transitory computer-readable medium of claim 10, further comprising program instructions stored on the non-transitory computer-readable medium that, when executed by at least one processor, cause the playback device to:
  receive a command to leave the synchrony group with the display device and the at least one additional play device; and
  based on the command, disable the second spectrum radio.

17. The at least one non-transitory computer-readable medium of claim 16, wherein the program instructions that, when executed by at least one processor, cause the playback device to disable the second spectrum radio comprise program instructions that, when executed by at least one processor, cause the playback device to:
  turn off the second spectrum radio and thereby disable the second spectrum radio from transmitting or receiving information via the second wireless spectrum.

18. The at least one non-transitory computer-readable medium of claim 16, wherein the program instructions that, when executed by at least one processor, cause the playback device to receive the command to leave the synchrony group with the display device and the at least one additional playback device comprise program instructions that, when executed by at least one processor, cause the playback device to:
  receive, from a controller device, the command to leave the synchrony group with the display device and the at least one additional playback device.

19. A method carried out by a playback device comprising a first spectrum radio for communication via a first wireless spectrum and a second spectrum radio for communication via a second wireless spectrum, the method comprising:
  operating in a first mode in which the first spectrum radio of the playback device is enabled and the second spectrum radio of the playback device is disabled;
  while operating in the first mode, receiving a command to join a synchrony group with a display device and at least one additional playback device that is playing back audio content;
  based on the command, beginning to operate in a second mode in which the second spectrum radio is enabled;
  receiving the audio content for playback, wherein the audio content corresponds to video content being displayed at a display device; and
  using the second spectrum radio, coordinating with the synchrony group to take over, from the at least one additional playback device, playing back the audio content in synchrony with the video content.

20. The method of claim 19, wherein the playback device comprises a wearable device.

\* \* \* \* \*